United States Patent [19]

Deering

[11] Patent Number: 4,864,629
[45] Date of Patent: Sep. 5, 1989

[54] IMAGE CORRELATION SYSTEM

[75] Inventor: Michael F. Deering, Mountain View, Calif.

[73] Assignee: Schlumberger Technologies, Inc., San Jose, Calif.

[21] Appl. No.: 134,590

[22] Filed: Dec. 17, 1987

Related U.S. Application Data

[63] Continuation of Ser. No. 815,419, Dec. 31, 1985, abandoned.

[51] Int. Cl.$^4$ .............................................. G06K 9/00
[52] U.S. Cl. .................................. 382/34; 364/728.05; 365/230; 382/42
[58] Field of Search ................... 382/41, 49, 33, 34, 382/27, 42; 364/728, 728.5; 365/230

[56] References Cited

U.S. PATENT DOCUMENTS

| | | | |
|---|---|---|---|
| 4,429,414 | 1/1984 | Asakawa | 382/34 |
| 4,434,502 | 2/1984 | Arakawa et al. | 382/41 |
| 4,484,349 | 11/1984 | McCubbrey | 382/27 |
| 4,498,141 | 2/1985 | Cooper | 364/728 |
| 4,543,660 | 9/1985 | Maeda | 382/41 |
| 4,561,072 | 12/1985 | Arakawa et al. | 365/230 |
| 4,566,082 | 1/1986 | Anderson | 365/230 |
| 4,644,503 | 2/1987 | Bantz et al. | 365/230 |

Primary Examiner—Leo H. Boudreau
Attorney, Agent, or Firm—David H. Carroll; Robert C. Colwell; Paul C. Haughey

[57] ABSTRACT

A method and apparatus for controlling a parallel combination of correlation circuits which compare image pixels. A number of correlation circuits are provided, each having its own memory. The memories are loaded with image data with each memory being assigned a different block (region) of the image. Each memory is also loaded with an overlapping portion of an adjacent block so that a pattern can be stepped across the entire block, including a match of the first column of the pattern with the last column of the block. The loading is done by generating addresses corresponding to addresses for the source image with one or more of the most significant bits modified so that the address sequence received by the second and subsequent memories are identical to the address sequence received by the first memory. This allows the various blocks of the image in the different memories to be later simultaneously accessed in parallel using a single address sequence.

9 Claims, 11 Drawing Sheets

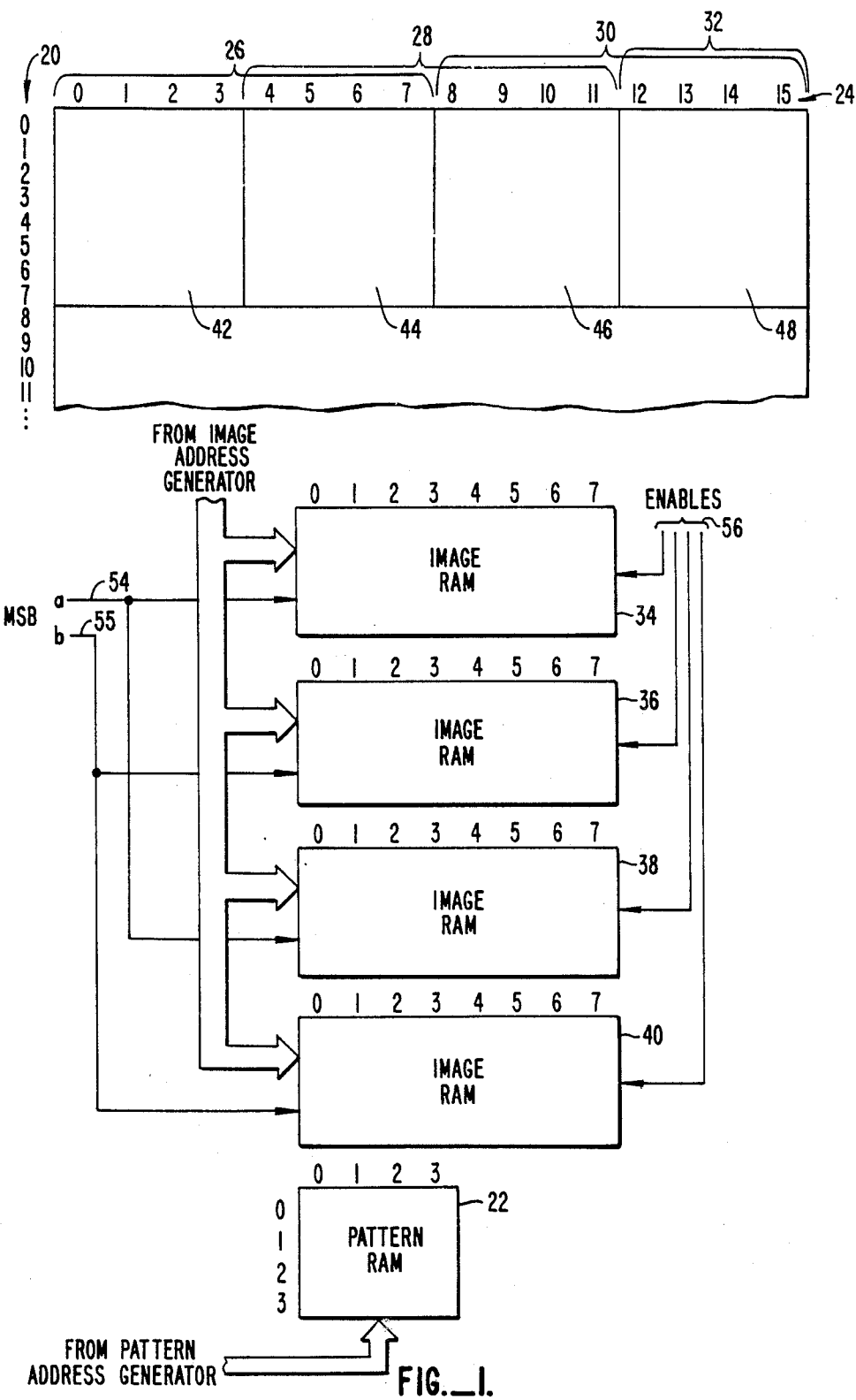
FIG._1.

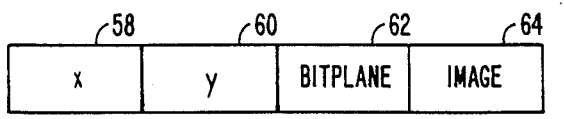
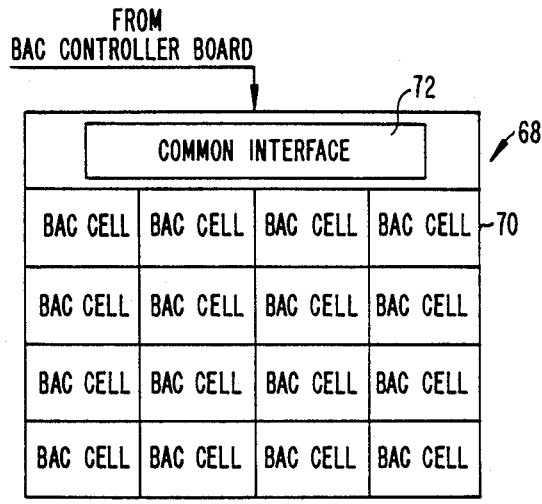
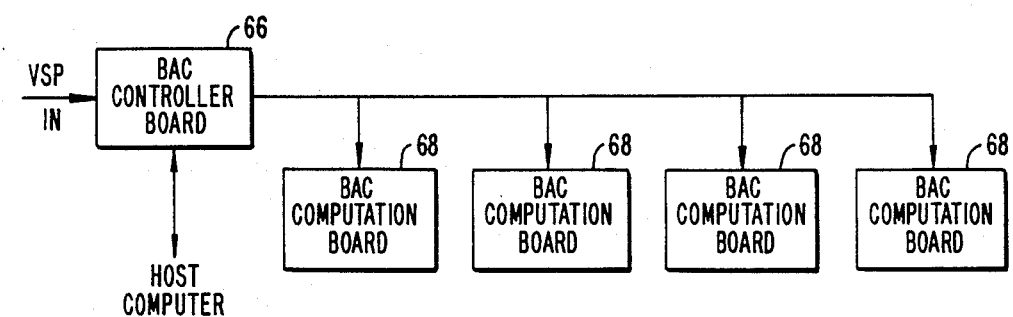

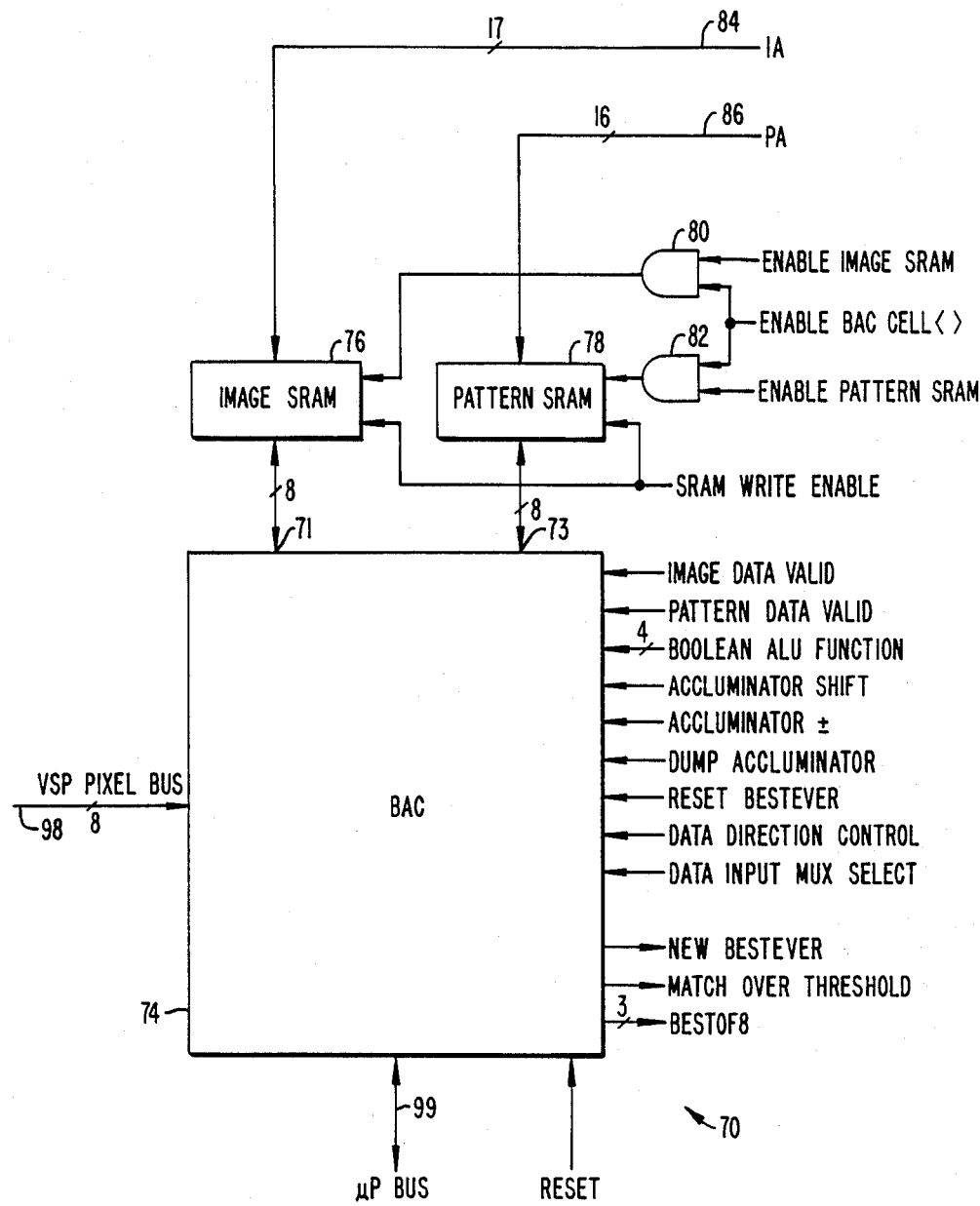
FIG._4.

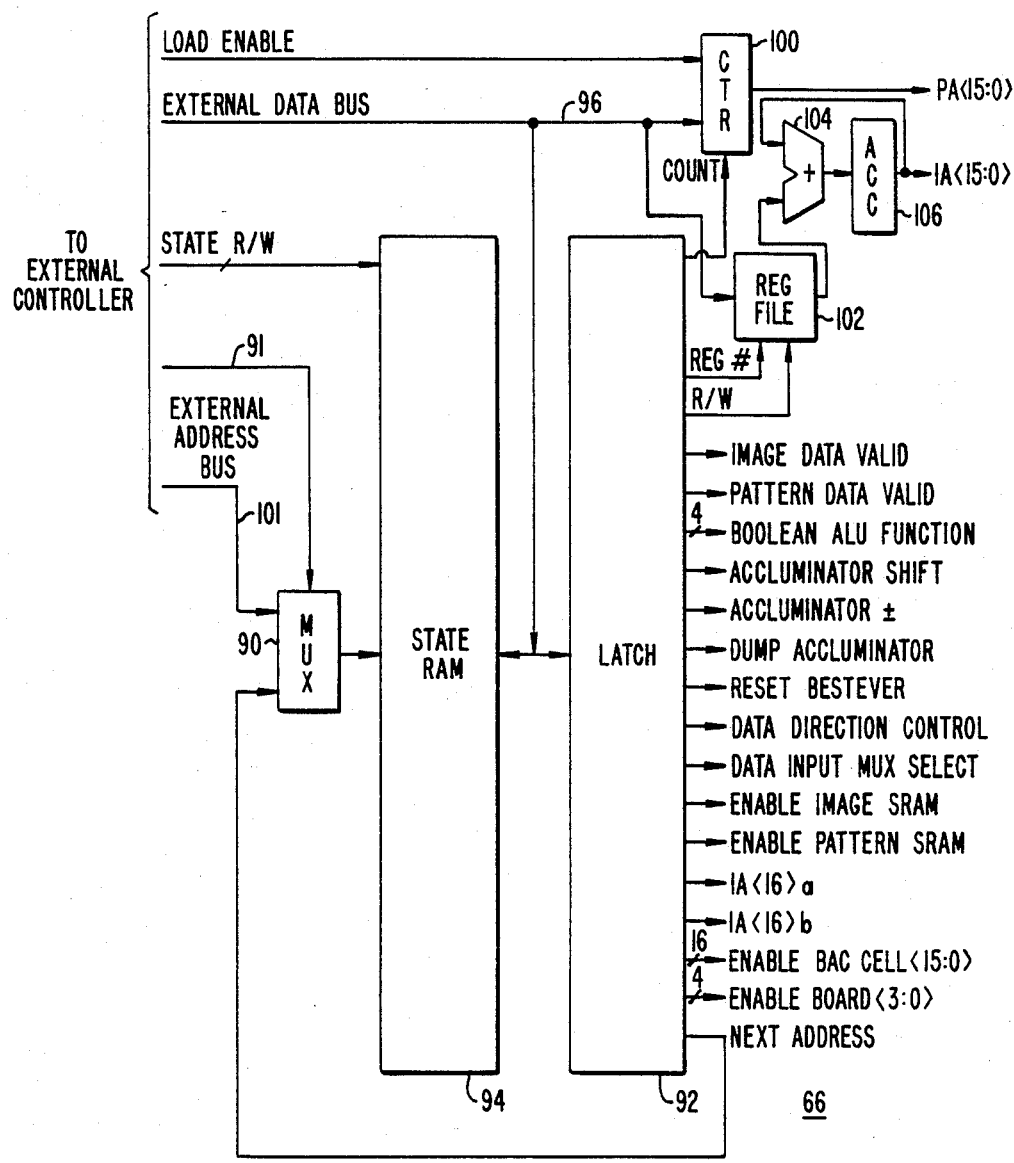
FIG._5.

IMAGE

```
          114
x(BYTES)  0   1    2    3  ...                          15
y(BITS) 0 │ 0  128  256 ...                                │
        1 │ 1  129  257                                    │
        2 │ 2  130  258                                    │
        3 │ 3  131   :                                     │
        4 │ 4  132                                         │◄─110
        5 │ 5  133                                         │
        6 │ 6  134                                         │
        7 │ 7  135                                         │
        8 │ 8  136                                         │
        9 │ 9  137                                         │
       10 │10   :                                          │
       11 │11                                              │
       12 │12                                              │
        : │ :                                              │
      125 │125 253                                         │
      126 │126 254                                         │
      127 │127 255                                         │
          └────────────────────────────────────────────────┘
```

PATTERN

```
x(BYTES)   0
y(BITS) 0 ┌─┐
        1 │0│
        2 │1│
        3 │2│ ◄─112
        4 │3│
        5 │4│
        6 │5│
        7 │6│
          │7│
          └─┘
```

FIG._6.

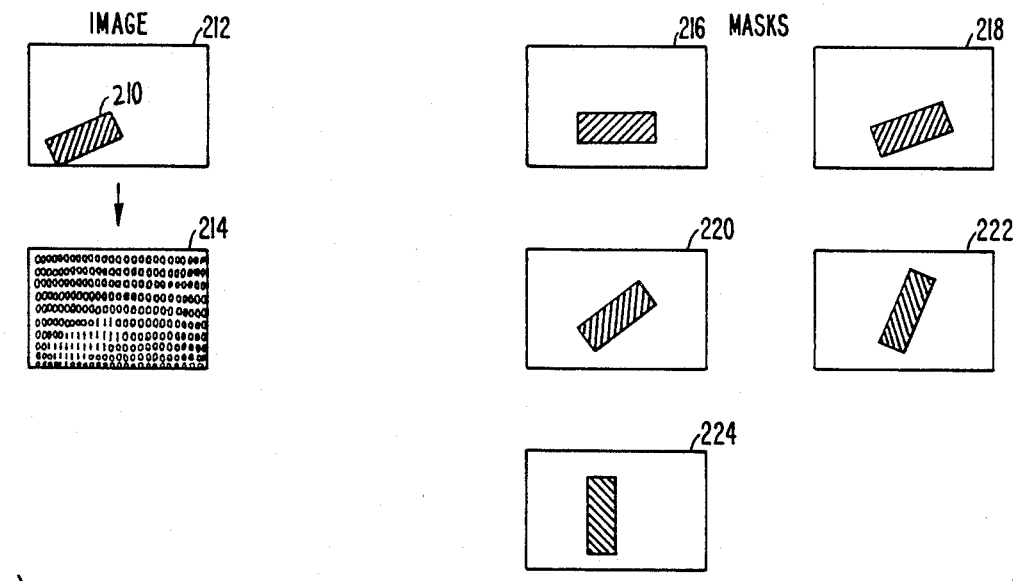
FIG._7.
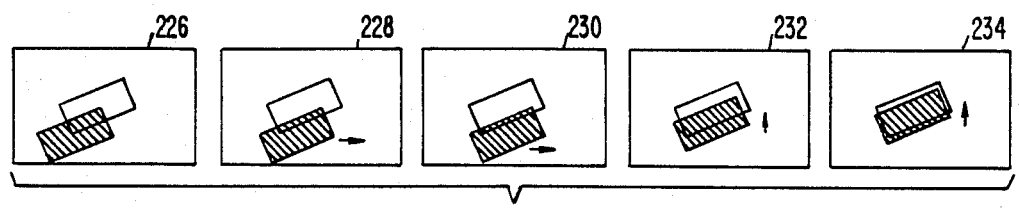
FIG._7A.
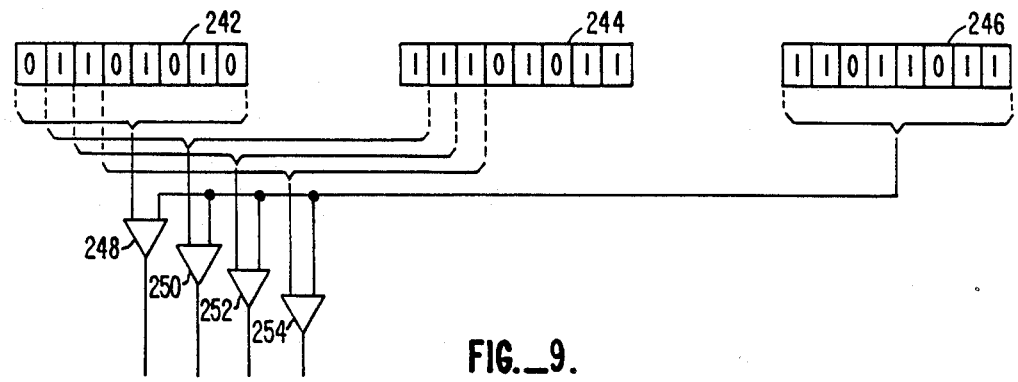
FIG._8.
FIG._9.

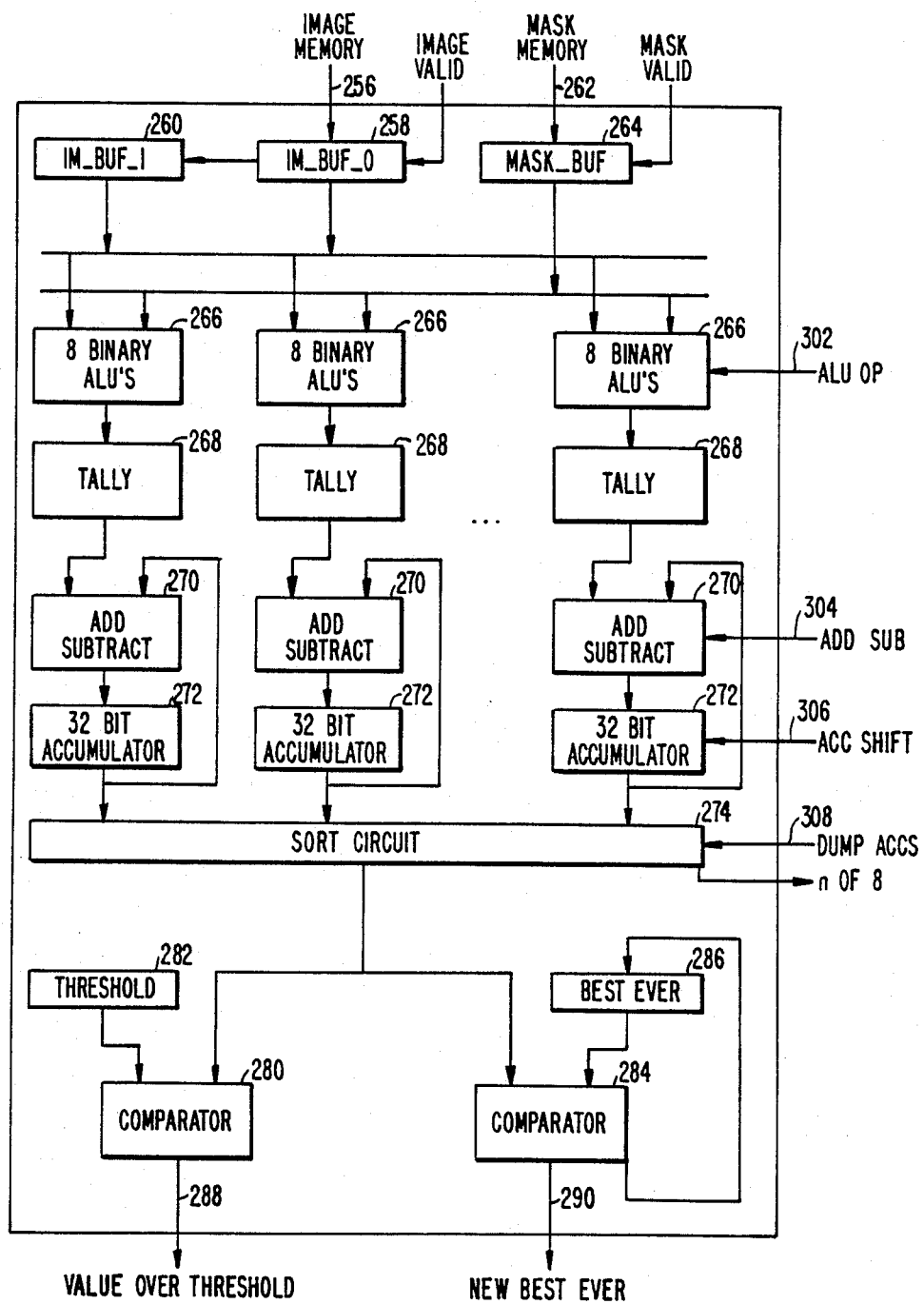
FIG._10.

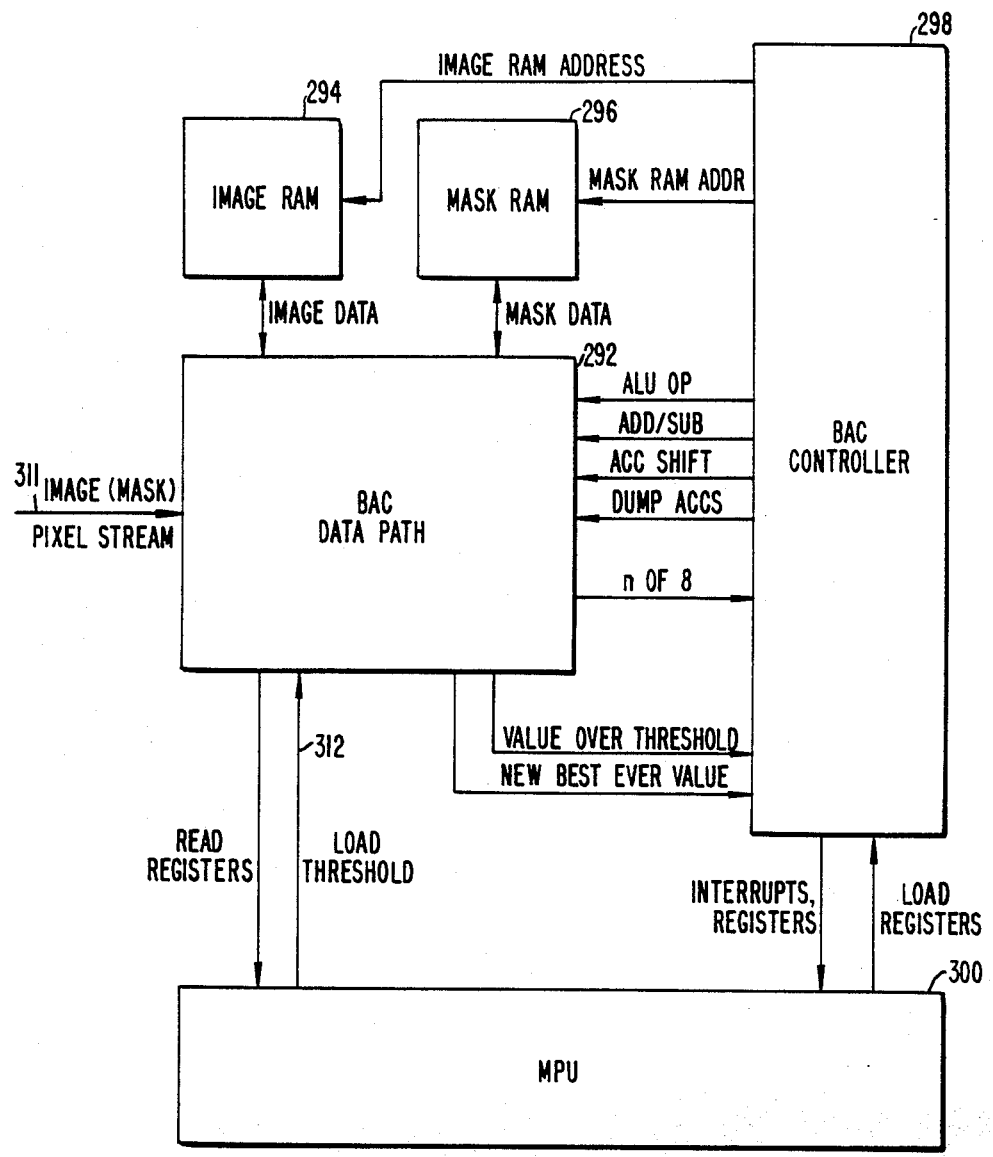
FIG._11.

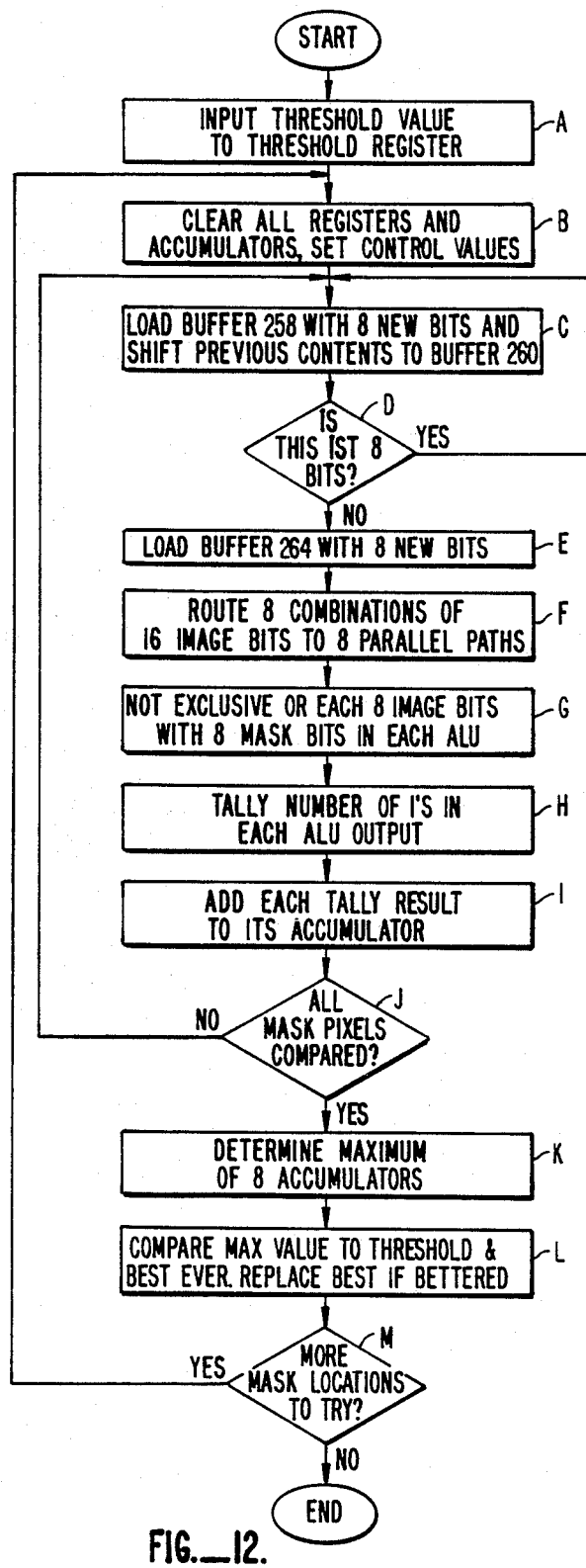
FIG._12.

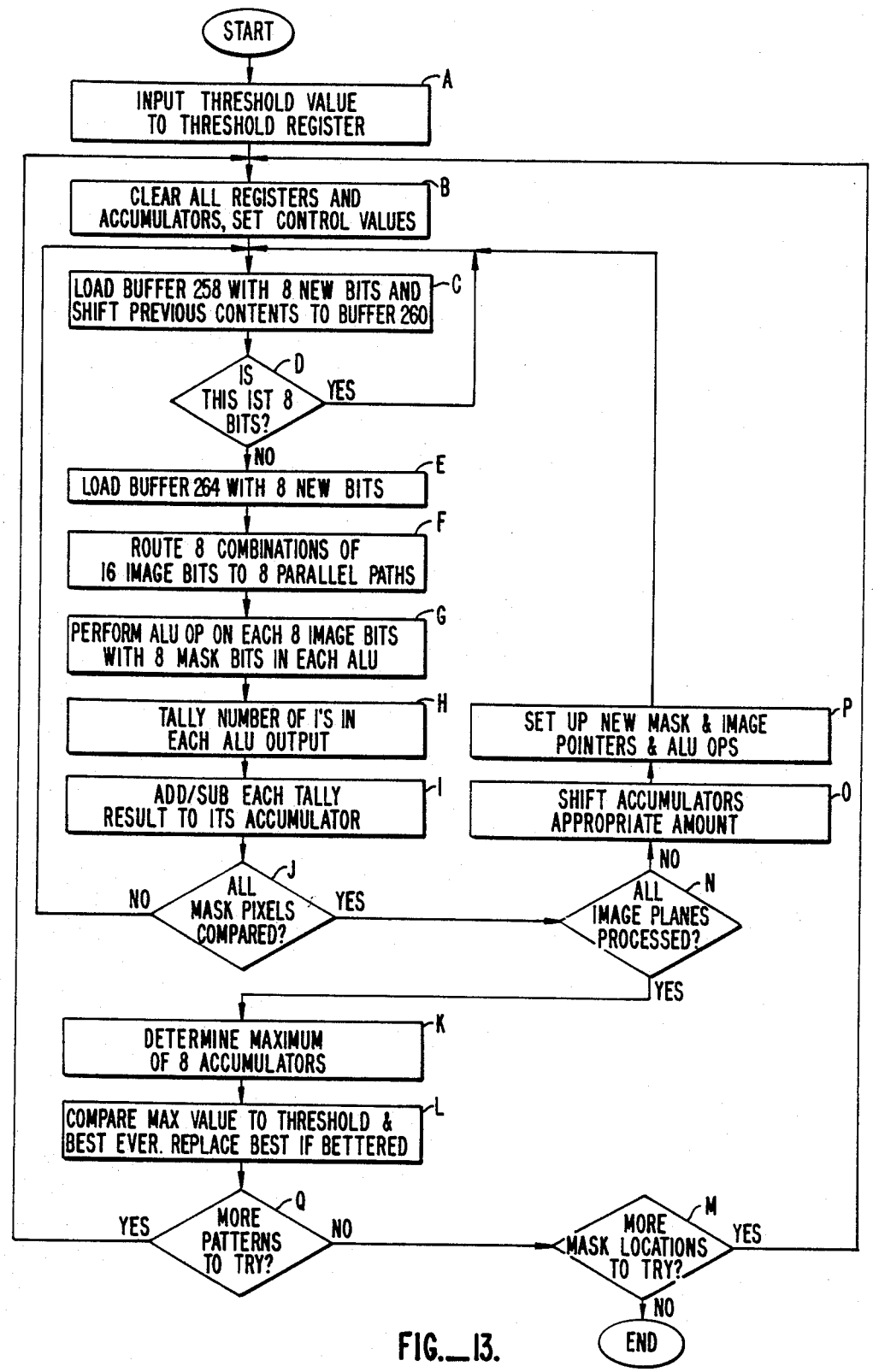
FIG._13.

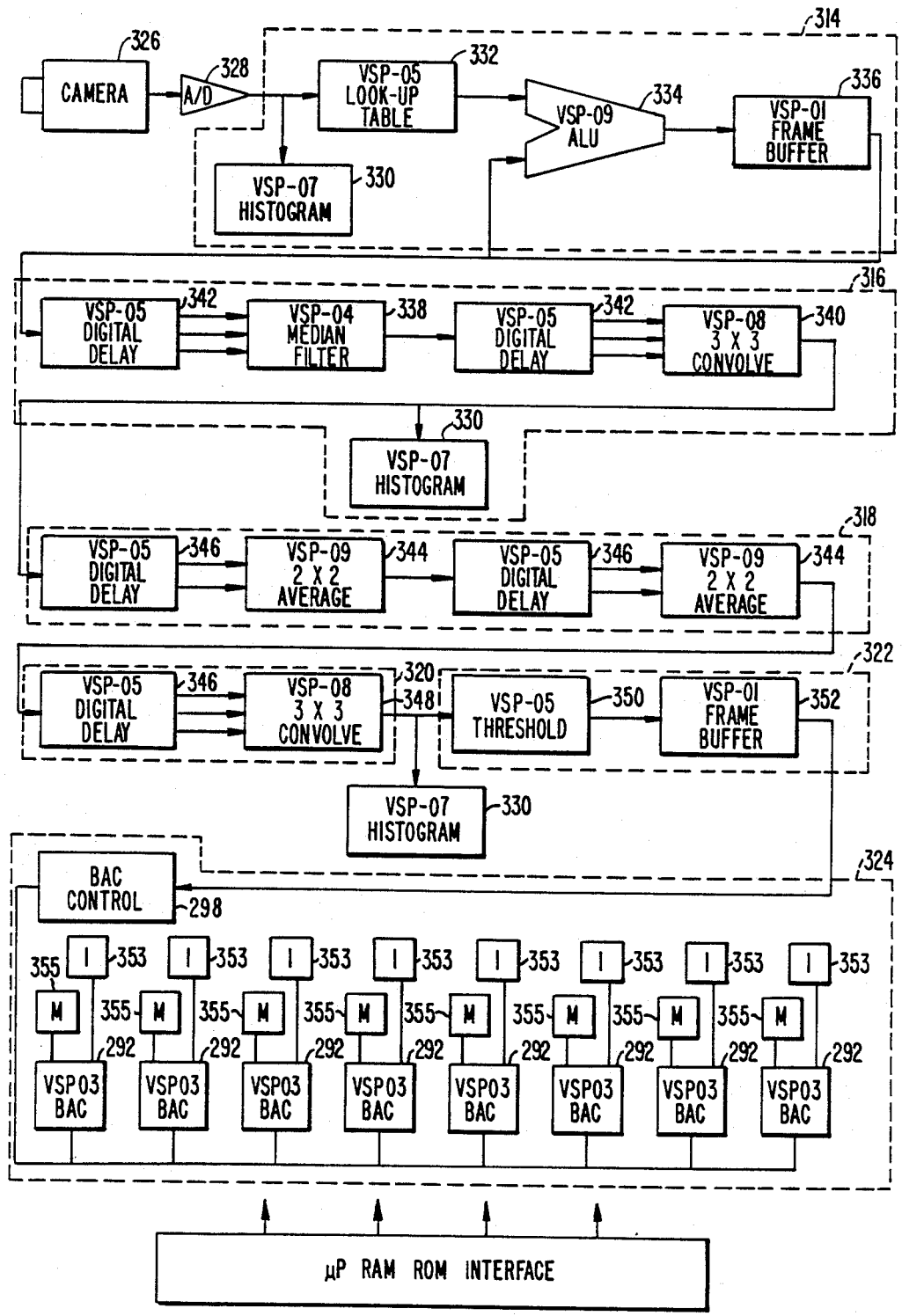
FIG._14.

IMAGE CORRELATION SYSTEM

This is a continuation of application Ser. No. 815,419, filed Dec. 31, 1985, now abandoned.

BACKGROUND

The present invention relates to systems for correlating patterns with images.

In image correlation, a desired pattern (e.g., a desired object to be picked up by a robot arm) is compared with an image from some source (e.g., a camera in an automated assembly line). Because of the large amount of data in the form of pixels in an image to be processed for image correlation, the employment of parallel processing for this comparison is desirable.

There exists a great commercial need for faster and more flexible computer vision systems. For many applications within automated assembly lines, existing computer vision systems are too slow, too limited, or both. Highly parallel VLSI (very large scale integration) based vision systems have the potential for achieving the speed and complexity advances required. Unfortunately, most computational systems do not do well in terms of system performance when applied in parallel. In the general case this is usually due to the lack of sufficient realizable parallelism in the problem to be solved, but vision is a high parallel activity. Existing parallel vision systems are able to do the initial massive parallel computation of the raw image data, but are ineffective in combining the results of the low level computations, analyzing the results, and passing the results of the analysis on to higher processing stages. Indeed complex vision processing can produce much more intermediate data than the amount of data in the initial image. If the architecture of the VLSI vision system is not designed correctly, the fundamental processing bottleneck in the system can be the passing of the intermediate data to the chips where it is needed.

The Fairchild Bit-plane Area Correlator (BAC) is an example of a circuit which does the actual comparison of image pixels to pattern pixels. The BAC was designed with the above problems in mind, and processes most of the image data directly on one chip, passing only limited higher level results back outside the chip. The BAC is a high speed engine for computing correlation style match functions between two images passed to it and was designed with parallel deployment in mind. To utilize the BAC in a pattern recognition system, a method of rapidly supplying a number of BACs in parallel with input images and stored patterns is needed.

Many image processing applications involve simply looking for the presence (or absence) of a known pattern and determining its location. Examples include locating parts on a conveyor belt, verifying the presence of parts during assembly operations, locating bonding pads and alignment marks on semiconductor chips, locating landmarks or targets in aerial imagery, and optical character recognition. Many video signal processing applications involve the computationally related process of convolving a two-dimensional signal array with a mask (e.g., to remove noise or enhance edges).

Both above classes of application require high-speed correlation (or matching) of a mask with an image. In addition, for the image processing examples, it is also necessary to determine the location with the best match. Traditionally, such functions have been implemented in special purpose boards using off-the-shelf components, resulting in large, expensive systems.

An example of how a correlation might be done is shown in FIGS. 7 and 7A. A rectangular image 210 in an image field 212 is captured by a video camera or other means, preprocessed to remove noise or other distortion or enhance edges, etc., and is then presented to a correlator. The image field 212 is represented as a series of binary digits as shown in field 214. Here the zeroes would represent a white background while the ones would represent the dark object.

In the correlation process, image 210 is compared with a series of masks 216, 218, 220, 222, and 224, which are stored in memory as an array of zeroes and ones. The masks have stored different orientations of an ideal image about one axis. The remaining two axes can be matched by moving the image horizontally and vertically, as shown in FIG. 7A. In FIG. 7A, image field 212 with image 210 is being matched against mask 220. As can be seen, the image is first shifted to the right as shown by fields 226, 228, and 230, and then is shifted upward until a best match is obtained. A simple way of determining a match is to compare each digital bit in image field 212 to each digital bit in mask 210 and produce a count of the number of bits which match. This count can then be compared with a threshold value which is chosen for a count which is close enough to indicate a match of the image with the mask. In one alternate method, a small portion of the ideal image could be stored as a mask (such as a 64×64 mask for a 128×128 image). Portions of the image can then be compared with the mask to determine where a match occurs.

Each line of the digital representation shown in field 214 is referred to as a scan line and the entire field 214 is referred to as a frame. The traditional method of shifting the image as shown in FIG. 7A is to input the digits of a scan line into a series of shift registers and shift the digits to the right sequentially and compare the digits to the mask at each shift position. Such a correlation method is shown in U.S. Pat. No. 4,200,861 to Hubach, et al. As can be seen, this requirement of shifting the bits of an image slows down the processing time due to the requirement for doing a comparison at each shift position.

The processing time required is further increased if one attempts to do gray scale matching. For gray scale matching, rather than each pixel of the image field 212 being either a digital zero or one, each pixel will be a binary number ranging, for instance, from zero to sixteen. Zero could represent white, with sixteen representing black, and the numbers in between representing different shades of grey. Each pixel is then represented by a four bit binary code as illustrated in FIG. 8. The correlation can then be done by comparing bits in a bit plane which consists of a corresponding bit in each of the pixels. The bit planes compared would be first the most significant bit in every pixel, with subsequent comparisons being made of the lesser significant bits. As can be seen, the number of shifts through a shift register required for a correlation is increased by severalfold, with a corresponding increase in processing time.

SUMMARY OF THE INVENTION

The present invention provides a method and apparatus for controlling a parallel combination of correlation circuits which compare image pixels. A number of correlation circuits are provided, each having its own memory. The memories are loaded with image data with each memory being assigned a different block (region) of the image. Each memory is also loaded with an overlapping portion of an adjacent block so that a pattern can be stepped across the entire block, including a match of the first column of the pattern with the last column of the block. The loading is done by using the addresses for the image but modifying one or more of the most significant bits of the address so that the later address sequence received by the second and subsequent memories are identical to the address sequence received by the first memory. This allows the various blocks of the image in the different memories to be later simultaneously accessed in parallel using a single address sequence.

The correlation system of the present invention is designed to operate under the control of a host computer which provides the pattern to be used and receives the results of the comparison activity. The correlation system is controlled by a controller board which receives image pixel data along a first bus from an image source and interfaces with the host computer on a second bus. The controller board preferably controls a number of correlation cells. The correlation cells can be combined onto a number of correlation boards. Each cell preferably consists of a first RAM (random access memory) for storing image data and a second RAM for storing pattern data. A cell also contains a correlation circuit which performs the actual comparison of bits from the image RAM and bits from the pattern RAM. Such a correlation circuit is the BAC chip shown in the BAC Application referred to above.

The controller board supplies control signals to the correlation cells and addresses to the individual RAMs in the correlation cells during a correlation process. The address generation for the image RAMs provides only addresses for a "window" of the block of the image stored in a particular image RAM, with the window having a size corresponding to the size of the pattern to be compared against. This window is then stepped across the entire image block to do the comparison. For each position of the window, the address generator begins at an address corresponding to a particular x,y position in the image block and provides addresses which increment along the x direction only for the width of the pattern and then restart at the beginning of the next row. This is preferably done using a number of registers to provide the initial x,y offset and to separately provide a number to be added at the end of each row to increment the address to the starting position on the succeeding row. These registers are coupled to an arithmetic logic unit (ALU) which adds the value of the register enabled to the value of the last address generated, which is stored in an accumulator. The output of the ALU is coupled to the accumulator and the output of the accumulator is used as the address.

The address generator for the pattern RAM is a simple counter since the entire pattern will always be stepped through linearly. The control system set forth herein thus provides the functions of:

loading fixed patterns into the BAC(s) pattern memory;

loading incoming images into the BAC(s) image memory;

generating appropriate control signals to sequence the BAC(s) through the details of the correlation operation itself;

generating addresses for the BAC(s) pattern memory in step with the correlation operation;

generating addresses for the BAC(s) image memory in step with the correlation operation;

responding to BAC indications of matches;

sequencing multiple correlation operations;

allowing an external device to modify the parameters of the correlation (the size of the correlation window, the match operation type, etc.); and dividing up the correlation task across the BACs, and coordinating their parallel processing.

All of these functions are interrelated. In particular, the method for loading the image memory in a multiple BAC system affects how the images are to be addressed during the correlation cycle.

The bitplane area correlator is a method and apparatus for simultaneously correlating a mask to a series of shifted position of an image. A number of overlapping groups of bits from a field representing an image are simultaneously supplied to a number of buffer registers in a Bitplane Area Correlator (BAC). Each overlapping group corresponds to a different shifted position of a portion of an image. Each of the image buffers' contents are simultaneously compared with the mask bits and a signal is produced indicating the results of such comparison for each of the image bit combinations.

Preferably, the results of such comparison are stored separately for each overlapping group, or combination. Subsequent groups of bits are then compared in sequence until the entire image has been compared. The results of the comparison are added separately for each combination, with each combination representing a different horizontal and vertical shift of the mask with respect to the image.

After the entire image has been processed, the combination with the best correlation to the mask is selected. This combination is then compared to a threshold value to determine whether there is a match of the image with the mask.

The correlation results for a combination which exceeds the threshold are stored and are compared to correlation results for a subsequent mask whose results exceed the threshold. For each subsequent mask compared, only the best fit is retained in memory. Thus, after a number of combinations have been compared, the memory will contain only the best match of an image at a particular horizontally or vertically shifted position with a particular mask.

The above BAC functions can be implemented on a single correlator semiconductor chip along with a separate controller. These devices could be one part of a Visual Signal Processing (VSP) system which could include a large number of BAC chips along with other circuits for processing the image. Typically, the image will be preprocessed before being supplied to the BAC to remove noise, etc.

In the preferred embodiment, two eight-bit image buffers are used, and eight shifted combinations of the digits in such buffers are fed to eight binary arithmetic logic units (ALUs). A mask buffer having eight bits is also fed as another input to each of the eight binary ALUs. After an appropriate ALU function, such as exclusive OR, the results of the function are fed into a separate tally unit for each of the eight parallel paths. Each tally unit counts the number of 1 bits in the resultant word from the ALU. Each tally result is then added to a separate 32-bit accumulator for each of the eight paths.

After an image is processed, the greatest value of the eight paths is selected and is simultaneously compared in two comparators to a threshold value for the image and a best ever match value. Outputs of the value over the threshold and a new best ever match are then provided. In addition to the addition function, a tally can be substracted from the accumulator as well. This enables the system to not only determine whether a desired image is present, but also to determine whether an undesired portion of an image is not present.

The use of parallel processing rather than the use of a shift register as in the prior art enables a tremendous increase in speed to be achieved, thus allowing real time video processing. In addition, the use of a universal ALU with an accumulator provides tremendous flexibility of operations. For instance, rather than a simple exclusive OR function as a method of correlating, the system can be programmed to use comparison by multiplication, the absolute value of a difference, etc.

The BAC significantly increases the rate at which correlations can be performed for a given pin or chip bandwidth (number of bits than can be input or output per second). A limiting factor for many correlators is the speed at which bits representing pixels can be input to the correlator, and the speed at which processed data can be output to an external computer for analysis. By inputting each group of eight bits only once, the speed of parallel processing can be taken advantage of without creating an input bottleneck.

Because the increased speed of the invention would also be unavailable if there were an output bottleneck, the correlator limits the number of output signals. This is done by including the summation and statistical analysis functions on the chip as discussed above. Only pixels which exceed some threshold force output activity.

The BAC does not generate a stream output, but rather condenses all its output down into a minimal form which the control microprocessor can process easily. Thus this component serves as an interface between the low level functions performed on huge amounts of data, in parallel, by the VSP hardware, and the higher level functions performed by the microprocessor, on condensed data.

The invention has the advantage that a number of BACs may be stacked, so that an arbitrary performance level may be achieved as an almost linear function of the number of correlator components used, up to the performance limits of the rest of the Visual Signal Processing (VSP) Circuit.

The BAC is highly programmable. It can perform a variety of functions, from arbitrary precision numerical correlation, to correlation of binary valued functions; it can handle special correlation allowing variable weighting of regions of the correlation patch, for example assigning some arbitrary region a weight of zero, as a "don't care" region.

For a further understanding of the nature and advantages of the invention, reference should be made to the ensuing detailed description taken in conjunction with the accompanying drawings.

BRIEF DESCRIPTION OF THE DRAWINGS

FIG. 1 is a schematic diagram of the division of an image into blocks for loading into image RAMS according to the present invention;

FIG. 1A is a table of a sample set of addresses used to load the image blocks of FIG. 1;

FIG. 1B is a diagram of an address byte;

FIG. 2 is a block diagram of a correlator subsystem according to the present invention;

FIG. 3 is a block diagram of an individual BAC printed circuit board according to the present invention;

FIG. 4 is a block diagram of an individual BAC cell in the printed circuit board of FIG. 3;

FIG. 5 is a block diagram of the BAC controller printed circuit board according to the present invention;

FIG. 6 shows an image block 110 and a pattern 112 used in the pattern matching processing.

FIG. 7 shows a diagram of an image and various masks;

FIG. 7A shows various positions of the image of FIG. 7 over a mask of FIG. 7;

FIG. 8 illustrates bit planes for a number of pixels;

FIG. 9 is a schematic illustration of the principle of the BAC;

FIG. 10 is a schematic diagram of a preferred embodiment of the BAC;

FIG. 11 is a schematic diagram of the embodiment of FIG. 10 incorporated in a correlator system;

FIG. 12 is a flow chart of a simple sample operation for the embodiment of FIG. 10;

FIG. 13 is a generalized flow chart of operations for the embodiment of FIG. 10; and FIG. 14 is a block diagram of VSP system incorporating the embodiment of FIG. 10.

DETAILED DESCRIPTION OF THE PREFERRED EMBODIMENTS

An understanding of the control system of the present invention requires an understanding of how a pattern is matched against an image. A detalled description of this process is contained in the BAC discussion herein relative to FIGS. 7–14. In general, the pixels of an image are matched against the pixels of a pattern to determine the presence in the image of an object depicted and stored in the pattern. The pattern will typically be much smaller than the image, and thus the pixels of the pattern must be compared to different blocks of the image.

FIG. 1 depicts a 15-column, 11-row portion of an image 20 is shown. A smaller pattern is stored in a pattern RAM 22. The dimensions of the image and the pattern have been arbitrarily chosen as an example. The object of the image correlation system is to compare the pixels in pattern RAM 22 to the pixels in the image 20 and provide an indication of all locations where the pattern seems to "match" the image, as designated by a given threshold. The threshold, for example, may be defined as a minimum number of pixels within the pattern which must exactly match the image.

The addresses of image 20 can be thought of as sequential addresses which extend first across the first row 24, labeled 0, then across a second row, labeled 1, etc. For parallel processing, the image may be divided in any desired manner. For example, a horizontal band seven lines wide along the y axis and 15 bytes wide along the x axis as shown in FIG. 1. The size and shape of the band is solely for example and other divisions of the image could be made just as easily. Each band has four blocks 42, 44, 46 and 48. The band is divided into four overlapping portions designated 26, 28, 30 and 32. These portions are loaded into image RAMs 34, 36, 38 and 40, respectively. Each of blocks 26-32 overlaps by half their width with another block so a pattern can be stepped across all possible positions in a block. Thus, referring to block 26, a four-byte-wide pattern would first be compared against x positions 0-3, then against 1-4, 2-5, and 3-6. This would all be done with the data stored in RAM 34. The data stored in RAM 36, corresponding to block 28, would correspondingly be compared to the data in columns 4-8, 5-9, 6-10, and 7-11. The overlap allows all of the pattern to be stepped across to the last column of image block 42, 44, 46 or 48.

The loading of RAMs 34-40 is done using the addresses of image 20 with a modification of one or more of the most significant bits as shown in FIG. 1A. Assuming that the addresses in the x direction cover 16 bytes, and dealing only with the x addresses for the moment, the binary representations of addresses 0-15 are shown in FIG. 1A. Addresses 0-3 are only provided to RAM 34, which is the first RAM enabled to receive the data in block 42. When the x address reaches address 4, this data, corresponding to block 44, must be supplied to both RAM 34 and RAM 36 because blocks 26 and 28 overlap for addresses 4-7. The addresses to RAM 34 simply continue as numbers 4-7. However, the addresses for RAM 36 must be modified. As shown in FIG. 1A, the first two bits of addresses 4-7, designated by dotted line 50, correspond to the least significant two bits of addresses 0-3, designated by dotted line 52. By separately controlling the next most significant bit of addresses 4-7, i.e., the third bit, addresses 4-7 can be converted to the identical addresses as 0-3. Thus, block 44 is loaded into RAM 36 at addresses 0-3 rather than at addresses 4-7. This enables the later address generation of 0-3 to provide both block 42 and block 44 in parallel. The only limitation on the location of the boundaries between blocks is that they must be a power of two.

By correspondingly controlling the most significant bits of the address for RAMs 38 and 40, image blocks 46 and 48 can be correspondingly loaded. Separate enable lines 56 (see FIG. 1) enable only the two RAMs which are to receive overlapping images as needed. For instance, for source image relative addresses 0-3, only RAM 34 is enabled. For addresses 4-7, both RAMs 34 and 36 are enabled. For addresses 8-11, RAMs 36 and 38 are enabled, and for addresses 12-15, RAMs 38 and 40 are enabled.

For the example shown, each RAM only receives 3 bits of address, so the state of most significant address bit 4 is not relevant because it is not supplied to any RAM. Thus, only the 3rd bit need be controlled. Since only 2 RAMs are enabled at any one time, the MSB (bit 3) used can be controlled with only two control lines, 54, 55. Each of these control lines is coupled to half of the RAMs, designated the "a" group and the "b" group, respectively. During image loading, only one RAM from each group will be enabled at any one time because the groups alternate as the blocks are sequenced through. As discussed later with reference to FIG. 2, more than one RAM from each group could be enabled to compare separate patterns simultaneously.

FIG. 1B shows a graphic representation of an address byte for image 20. The first portion 58 of the byte corresponds to the x address, the second portion 60 corresponds to the y address, the third portion 62 corresponds to the "bitplane" (a bitplane of an image is a binary image constructed from a single bit from each pixel in the original image), and a fourth portion 64 corresponds to the image (i.e., when several separate images are stored in the image memory). Because the x bits in portion 58 are more significant bits than the y bits 60, a number must be added to increment each x address byte which is large enough to increment the lowest x value without affecting the y values. Thus, the entire length of image blocks 42-48 are covered.

The bit plane address 62 can also be used if desired. For instance, where each pixel is given a several-bit grey scale designation, each bit plane corresponds to a particular bit of that grey scale designation. Thus, the addressing scheme shown above will address all of the different bit planes corresponding to the various portions of the grey scale. In addition, a number of images may be processed as designated by address portion 64. Portions 62 and 64 need not be included, and the dividing line between the x and y designations could be varied.

The present design assumes that the logical x address of image RAMs 34-40 is contained in the upper bits of a 17-bit image RAM address. The logical y address resides in the lower bits. The dividing line between x and y is not fixed, and can be varied by a controller as needed. This allows different width x-partitions, and greater or smaller numbers of rows of the image to be stored in the local image RAMs 34-40, where the lowest bit of the y address is also variable. Thus, images of different widths can be processed, and different size RAMs could be employed as image RAMs.

In practice, the image RAM address can contain fields in addition to the x and y location within the image. If grey scale image matching is being performed, there will be several identical size image bitplanes, one for each bit of grey scale. Alternately, the image RAM may contain a copy of the image from the previous frame, so that "optical flow" image motion based calculations can be performed. Whatever the reason, the additional images can be selected by allocating them out of the addressing space represented by the bits below the x address. They can be algebraically mixed with the y addressing bits to allow "non-power of two" boundaries between blocks. However the addressing bits are allocated, the image RAM address generation sequence will use relative constants to bounce the RAM address between these image data areas.

Any particular BAC processing sequence must assume a particular fixed partitioning of the image RAM (and pattern RAM) address space. Whenever an image is actually processed, exact allocations have been made. However, these allocations are fixed only as long as the controller state machine RAM 94 is not changed. A host computer system can dynamically change BAC configurations between frames by downloading different data into state RAM 94. This is the intended method of configuring the BAC system. This simultaneously provides for a maximum of flexibility and run time efficiency. The state machine can sequence the BACs far faster than any general purpose computer could, but the sequence is indirectly controllable by an external computer.

A system using the control system according to the present invention is shown in FIG. 2. A BAC controller board 66 receives visual signal processing (VSP) input signals and also has interconnections with the host computer. The host computer interconnections allow programming of the controller board as well as provision of a pattern to be compared. Output signals designating the matches of the pattern with the image are provided through this connection to the host computer. One or more BAC computation boards 68 are coupled in parallel to BAC controller board 66.

The preceding discussion assumed a single BAC board 68. By using several boards as shown in FIG. 2, only one could be enabled at any one time, thus increasing the number of pieces an image could be divided into. Alternately, two or more boards, or two or more BACs on the same board, could be enabled at the same time to compare the same image block against different patterns simultaneously. This gives pattern parallelism (several patterns at once) by slaving additional BAC boards 68. The patterns used in parallel could be separate offsets of the image to increase processing speed. Four different offsets could be used, one for each BAC board 68, with the image then being stepped through only every fourth line for correlation. In addition, more controller boards 66 could be used in parallel, either slaved together or processing a different band of the image. A first board could process the blocks in a first band of the image while a second board could process the blocks in a second band of the image.

The configuration of each BAC computation board 68 is shown in detail in FIG. 3. As can be seen from FIG. 3, each computation board 68 will usually have a number of BAC cells 70 and interface circuitry 72.

An individual BAC cell 70 is shown in FIG. 4, and includes a BAC integrated circuit 74 with the elements set forth in the above referenced BAC Application. A static RAM (SRAM) 76 provides 8-bit wide image bytes to BAC 74 and a pattern SRAM 78 provides 8-bit wide pattern bytes to BAC 74. A pair of AND gates 80, 82 provide enable signals to SRAMs 76 and 78, respectively. SRAM 76 receives a 17-bit image address 84 and SRAM 78 receives a 16-bit pattern address 86. The remaining control signals for BAC 74 will be described below.

The BAC has two data inputs, one for image pixel data, the other for pattern pixel data. (The BAC may also receive both image and pattern data over just the image pixel data input bus 98.) While multiple BACs could share image or pattern memories, for maximum flexibility in the preferred embodiment each BAC has associated with it a separate image and pattern static RAM chip. All BACs do share common pattern RAM address, common image RAM addresses (except for the uppermost significant bit), common pixel data input bus, and BAC pipeline sequence control signals.

The parallel BAC system controller requires complex address generation for the BAC RAMs and complex control signal sequencing for the BACs internal bus. One general method for the later is a horizontally coded microcoded state machine. This allows arbitrary bit values to be supplied on each cycle for control of the BAC pipe. The controller shown in FIG. 5 utilizes this design.

FIG. 5 shows the circuitry of controller board 66. A RAM 94 is used as a state machine to provide the sequence of control signals and addresses needed by the BACs. A multiplexer 90 receives addresses from an external controller and a next address from a latch 92. A control signal 91 from an external controller determines which address will be used to select a control signal or address signal code stored in state RAM 94. State RAM 94 can be loaded from the external controller via an external data bus 96. A pixel bus 98 (shown in FIG. 4) provides the actual pixel data to the image RAM 76 and pattern RAM 78 through an internal multiplexer in BAC 74.

As shown in FIG. 5, the address data for the image and pattern pixels are provided along bus 96 to a counter 100 and a register file 102. The pattern addresses are simply provided at the output of counter 100 by appropriate signals from latch 92. The image addresses are provided from register file 102 through an ALU 104 and an accumulator 106.

The loading of image RAMs as discussed with respect to FIG. 1 is accomplished using the control signals shown in FIG. 5. The individual RAMs are enabled using the enable image SRAM or enable pattern SRAM signals and the enable board and enable BAC cell signals, which correspond to enable lines 56 of FIG. 1. The lines designated IA(16)a and IA(16)b control the physical MSB (most significant bit) provided to the image RAMs. In this example, only the MSB provided to the image RAMS is controlled, and not any of the more significant bits in the source image address. One group of image RAMs is the a group, and the other is the b group, as discussed with reference to FIG. 1.

An external controller (not shown) directs the operation of the correlation system under the control of a host computer (not shown). The external controller could be, for example, an AMD 29116 based processor. The microcode store is dual ported to the external host computer. This allows customized correlation configuration data to be downloaded from the host computer. The external controller generates addresses on the bus 101 and data on bus 96 to set up state RAM 94 to do the address generation and control signal sequencing. The external controller also resets pattern address counter 100 and loads register file 102. Alternately, a register in register file 102 could be used to reset counter 100.

The standard VSP microprocessor interface shown at the bottom of each BAC chip 74 (see FIG. 4) is attached to the external controller data bus 96 and address bus 101 to allow bidirectional data transfer between the external controller and the BACs.

The incoming images from the prior VSP (or other) processing stages enter the BAC system and are directly connected to the VSP pixel-data-in port of all the BACs. The BACs have an internal multiplexer that places the VSP pixel data immediately at the image pixel data and pattern pixel data ports 71, 73. The external controller only examines the handshake signals, and the BAC address generation circuit of FIG. 5 generates the RAM addresses and SRAM allows enabling the incoming pixels to flow into the image (or pattern) SRAMs 76, 78.

To describe the operation of address generation for the image RAMs, assume that a match procedure is used that will exhaustively try matching the pattern at all possible positions within the image. This does not have to be the case; there are many other pattern matching algorithms that are not so brute force.

By making this assumption, the overall problem is reduced to that of performing a large number of direct matches. The problem now becomes a search procedure: taking the pattern, placing it on top of the image, and sliding it in raster scan order across and down the image, checking each position to see if the portion of the image directly under the pattern matches the pattern. We can now concentrate on creating a one-on-one match algorithm for the pattern against a fragment ("window") of the image exactly the same size as the pattern.

The position of the pattern relative to the image at any instant is termed the pattern offset. It is the x-y offset of the upper left-hand corner of the pattern from the upper left-hand corner of the image. The term image window will refer to the portion of the image directly under the pattern at a given pattern offset. The "image window" is the same size as the pattern (with an exception described below).

For a given pattern offset, the task is reduced to matching two identical size pictures. These pictures are the pattern and the image window. There are many ways in which this could be done, but we will assume a simple case in which the pattern is compared pixel by pixel to the image window. The result of each individual comparison ("pixel matches") is summed, giving an overall match score for each particular pattern offset.

There is a wide range of choices for pixel-to-pixel match operators. For binary images, the simplest is the exclusive-OR of the pixel bits. For grey scale pixels, multiplication or absolute difference of the pixel values have good theoretical bases. Numeric summation may be used to combine the results of the individual pixel matches. The details of the possible pixel by pixel match operations are discussed in the BAC Application.

The BAC is a complex correlation engine. It does not just sequentially match pairs of pattern and image window pixels one at a time and wait for the controller to cycle it through all pixels in the pattern. The BAC matches eight pixels at eight different offsets every clock cycle. This is a total of 64 pixel matches per clock cycle. The BAC operates on binary pixels, packed eight pixels to a byte data word. The job of the controller is to optimally sequence this engine through the pattern matching task.

Address Generation

After image SRAMs 76 of BAC cells 70 have been loaded with different blocks of an image, the controller of FIG. 5 generates addresses to these RAMs to cause the appropriate pixels to pass into the BAC for the pattern matching processing.

For the sake of an example, we assume that each image block is 128×128 bits and the pattern is 8×8 bits. These are shown in FIG. 6 as image block 110 and pattern 112. Because the BAC operates upon packed pixels, the sizes of the arrays in bytes are 16×128 and 1×8, respectively.

Because the BAC processes eight consecutive offsets in parallel, we only have to try offsets that are a multiple of eight, e.g., byte-aligned. Thus, to match the first row of the 8×8 pattern 112, the BAC needs the first byte from the pattern RAM, and two bytes from the image RAM. (Two bytes are needed because of the eight different offsets that are being simultaneously tried by the BAC.)

Starting with an offset (0,0) e.g., trying the pattern at the upper left-hand corner of the image, the byte addresses needed to match the entire 8×8 pattern are set forth in the following table. The physical location of the pixels in the image for these addresses is designated by dotted line 114 in FIG. 6.

| Image (pairs) | Pattern |
|---|---|
| 0,128 | 0 |
| 1,129 | 1 |
| 2,130 | 2 |
| 3,131 | 3 |
| 4,132 | 4 |
| 5,133 | 5 |
| 6,134 | 6 |
| 7,135 | 7 |

To perform matches at other pattern offsets, the same addressing sequence would be repeated, but with the particular pattern offset added to every image address. For this example, the conversion from a bit-aligned x,y coordinate offset to an address offset is $128 \times (x/8) + y$.

The addressing sequence for pattern memory 78 is independent of the pattern offset, and will remain the same for each pass. This is because the pattern data is always stepped through linearly. A simple up counter 100 can generate the pattern RAM addresses. The controller need only preset the counter 100 to particular start values, and selectively enable counting. The image address requires a more complex address generator.

Referring to FIG. 5, the image RAM address generation is done as follows:

START: At the start of matching at a particular pattern offset, the image RAM address (IA) is set to the address of the first byte of the image window, i.e., the upper left-hand corner byte. This is just the pattern offset in x,y coordinates computed into a linear address within the memory of the image RAM 76. If the pattern offset is (xo,yo) and the image height is "Image Height" pixels, this linear version of the pattern offset is given by $(xo/8) \times$ Image Height $+ yo$.

SCAN x: As the bytes of a row of pixel data are processed, the x address portion IA is incremented by one. This is done by adding the contents of a register in register file 102 with a value of Image Height to the last address in ALU 104. The new address is then supplied to accumulator 106. This continues for as many bytes as are in the pattern, plus one (e.g. Pattern Width/8+1).

SCAN y: After the address of the last byte on a given row has been generated, the IA is advanced to the first byte of the image window on the next row of the image. This is done by adding the value of $(1 - (\text{Pattern Width}/8) \times \text{Image Height})$ to IA. This moves the IA back to the left-hand side of the image window, one row down. This corresponds to the "horizontal retrace" in a raster scan system. This is accomplished by enabling a register in register file 102 having a value of $(1 - (\text{Pattern Width}/8) \times \text{Image Height})$.

FINISH: The match is completed when a number of rows of data equal to the height of the pattern have been processed.

This complete raster scan processing of a one bit per pixel pattern against a one bit per pixel image window will be referred to as a pass. The loadable register file allows many different precomputed increments to be selectively added to the accumulator.

The same type of raster scan emulation described above can be used to step the pattern offset through all the possible match positions in subsequent passes. The pattern offset is contained in one register of register file 102, and after each pattern match or pass is complete, Image Height is added to it, bringing it to the next possible match position, or pattern offset. When the pattern offset reaches column number (Image Width/8-Pattern Width/8−1), the quantity (1−Image Height×(Image Width/8- Pattern Width/8−1)) is added, rather than Image Height, to bring the offset to the first position on the next line down. This is done because the right-hand side of the pattern has reached the right-hand side of the image portion being compared. This process continues until (Image Height-Pattern Height) rows have been processed. The offset does not take on all possible x,y values in the image; it is restricted to only have values that allow the pattern to be completely contained within the image.

In many cases, the pattern to be matched is not only one image, but two or more images. An example case comes from binary image matching where the image exists completely in a single binary image (a single "bit-plane"), but in which two pattern subpictures are used (two separate bitplanes). This would be the case in which one pattern contains ones where the image window must have ones, and the second pattern contains ones where the image window must have zeros. Any pixel position which is not covered by a one in either pattern is effectively a "don't care" pixel position, and will not affect the match score.

For IA generation for this two-pass operation, all that has to be done is to not increment the offset value between the first and second pass. This will cause the correct image RAM addresses to be generated twice. For the pattern RAM address generation, after the end of the first pass, the initial pattern RAM address in PA counter 100 merely needs to be loaded with a pointer to the second pattern. (The second pattern will also be prestored in pattern RAM 78.) This is a two pass matching operation because it requires two go-arounds of the fundamental BAC processing loop: the matching of two single bitplane pictures.

For grey scale processing with the BAC, there will be in general several different bitplanes for both the image window and the pattern. The general match procedure must make multiple passes over the area of the pattern, generating address sequences that only differ in the bitplane into which they point. This is accomplished by adding/subtracting a relative specific bitplane address to the pattern offset before each pass.

Thus, in general, register file 102 will contain pointers and constants, and during each cycle one of these will be added to accumulator 106 to produce the desired image RAM address sequence. The selection of the register from register file 102 to use each cycle, and other control parameters can be generated by RAM based state machine 94.

Although the above discussion described splitting an image along the x-axis, there are basically three types of parallelism potentially available for exploitation. These are Y-parallelism, X-parallelism and pattern-parallelism. These correspond to three ways in which the matching task can be split into subtasks, each assigned to separate BACs. If the image is partitioned along the Y-axis into bands, and the bands assigned to separate BACs, this is Y-parallelism. Partitioning along the x-axis is X-parallelism. Pattern-parallelism is possible when there is more than one pattern to be matched per offset in the image. In both X- and Y-parallelism, the partitioning of the image must have an overlap of equal (width or height) to the (width or height) of the pattern(s) to be matched. Y-parallelism can be transformed into pattern-parallelism by creating instances of the desired pattern(s) being sought at different y-offsets internal to the pattern frame. Separate patterns are assigned to separate BACs.

As with most partitioning of problems in parallel, there are constraints and restrictions on the application of each of these three. Under many circumstances, two of, or all three of these methods of parallelism can be simultaneously applicable.

Pattern-parallelism is limited to the number of different patterns that are intended to be tried at each offset in the image. Thus, an application primarily looking for instances of a single pattern will not harbor any pattern-parallelism, but an application looking for instances of a plurality of objects, and/or many different rotated descriptions of object(s), will have large amounts of usable pattern-parallelism. Note, however, that multiple patterns for which mutual match-inhibition is sought are most efficiently run on the same BAC per offset. If the best match of two or more patterns is to be selected, this is most efficiently accomplished if these patterns are run on the same BAC, which has the side effect of effectively reducing the available pattern-parellelism.

Other Control Lines

The controller of FIG. 5 also produces other control signals used by the BAC as described in detail in the BAC Application and generally described below:

Image Data Valid Line. Assertion of this line indicates that valid pixel input data is present on the image pixel data bus. Controller 66 will assert this after a new valid address has been presented to image RAM 76.

Pattern Data Valid Line. Assertion of this line indicates that valid pixel input data is present on the pattern pixel data bus. Controller 66 will assert this after a new valid address has been presented to pattern RAM 78.

4 Bits of Boolean ALU Function. This specifies which of 16 Boolean functions will be applied to the image window and pattern bitplanes. These bits generally only need to be changed between passes, but it is simpler to have the state machine specify them every clock cycle.

BAC Accumulator Shift Function. This signal will only be asserted between passes. Its effect is to multiply the value of each of the eight internal BAC summation accumulators by two. The result is to "weight" partial summation results during matching for grey scale and other processing. It is asserted for a selected number of clock cycles (usually zero or one) to multiply the accumulators by two raised to the power of the chosen number of clock cycles for which the signal is asserted.

BAC Accumulator Add/Subtract Control. The BAC's eight "summing" accumulators instead can be "subtracting", i.e., subtracting new input from the present accumulator values rather than adding. This line controls whether values are added or subtracted to the accumulators. Addition is usually specified, subtraction is used in conjunction with complex multi-pass matching when negative subpatterns, which must not be present, are desired. This line is to be changed only between passes, and has pipeline restrictions upon it restricting when it can be changed even during the inner pass time window.

Dump BAC Accumulator. This line indicates the end of input data for a particular pattern offset. It is asserted after all the desired passes have been made over the pattern and image window. The BAC will send the eight accumulator contents to the statistics section of the BAC, and zero the accumulators in preparation for the start of processing for the next pattern offset to be processed. A fixed number of cycles after this signal is asserted, the BAC will signal back the results of the statistical processing on the BAC output lines.

Reset Best Ever Score. This signal resets (to zero) the BAC's internal "best ever" match score register, described in more detail below.

BAC Pixel Input Select, BAC RAM Data Line Direction Control. To save an external multiplexer per BAC "cell", the BAC is capable of selectively taking pixel data entering either the 8-bit input pixel port 98 or the 8-bit microprocessor data port 99, and supplying it on both the image RAM and pattern RAM data buses 71, 73. The first control line selects which input is received, the second enables the RAM data lines as outputs rather than inputs. These control lines are only used when initially loading the image and pattern RAMs.

All these control signals are subject to internal BAC pipeline delays, which must be taken into account when fixing the relative timing between all the BAC signals. Delays also arise due to pipeline delays of external components, e.g., the image RAM and pattern RAM, various latches and buffers. The state machine approach to design makes these delays relatively easy to implement.

The BAC has a reset pin, which resets most internal values to reasonable initial states. One of the BAC's internal registers is the match threshold register. This threshold value is the minimum standard against which all match results will be compared. Only those matches that exceed this threshold will cause the BAC's external "match over threshold" pin to be asserted. To utilize this feature, the threshold register must be first written into by some means external to the BAC through its microprocessor interface.

In general, it is desirous to have a hardware mechanism for the controller to read and write BAC registers through the BAC's microprocessor interface. When this I/O is rare, it can be implemented with a general purpose microprocessor.

BAC Interrupt Processing

The purpose of the BAC programming is to find all the locations (offsets) within the input image where the pattern matches "well enough". "Well enough" usually means matches where the match score exceeds some fixed threshold. Many times one is also interested in "how well" the patterns match, i.e., what the numeric match score was. The BAC will automatically record the highest match score ever achieved since the last "reset best ever" signal. Thus, one can run a large number of matches on a BAC and obtain the best score after all the processing is complete with one read operation. The problem, however, is that this technique only provides the numeric value of the best match, not its location. To get the location, the address (pattern offset) in use plus the "best of 8" indicated by the BAC whenever the BAC signals "new best" must be recorded. Thus as long as only the location of the single best match is desired, the location information requires only one storage location (a latch, register or RAM word). In cases where all the locations in which the match exceeded the match threshold are desired, RAM generally must be utilized.

A general purpose microprocessor is used to sequence the latching of the "good" locations. Because the matches take many clock cycles to perform, new "good match" locations can only be generated at a limited frequency. In many applications, especially ones with complex multi-bit multi-pass patterns, the time taken to perform a match is measured in microseconds or even tens of microseconds. This is slow enough for general purpose microprocessors, rather than dedicated hardware, to be utilized.

The BAC address generator subsystem of FIG. 5 does all the necessary high-speed control work for running the BACs at speed. However, the BAC address generator itself needs to have its RAM state table 94, register file 102, and pattern address counter 100 initialized. This must take place every subpass of a pattern plane by an image plane, e.g., every 16 clock cycles for a minimum 8×8 pattern, every 48 clock cycles for a 16×16 pattern. This initialization can be performed by a slower conventional bitslice (or other) control processor (referred to as external controller in FIG. 5 and not shown). Typically, the state table is not changed every pass, and is only updated every new image frame time or less (many milliseconds).

The external controller can also process the results of the match processing. If this machine has a "find first set bit" instruction, then it can quickly examine a "greater than threshold" 16-bit state register to find which, if any, BACs had a match during the last cycle. If more than one BAC board is attached (assuming 16 BACs per attached BAC board 68), then several such tests will be needed, up to the maximum of four. Because the most common case is no matches, this can be quickly dealt with by even a relatively slow processor. The second most common case is exactly one match, which is also easy to deal with, and can usually be completely overlapped with the matching of the next offset. Cases in which more than one match are found may cause the main match cycle to have to halt and wait on the slow processor, but this is a relatively rare occurrence, and will have little detrimental effect the overall processing rate.

The "match result processing" operation is as follows. The 16-bit "match greater than threshold" latched value is examined for the first set bit. If none are found, then no matches occurred during the last offset, and the match result processing is temporarily complete.

If one match is found, the processor next reads the three-bit offset number associated with the indicated BAC (the "best of 8" output) and, if requested, extracts from that particular BAC the winning match value. This information is combined with the x,y offset position associated with the last offset processing cycle and is either pushed onto a stack for later re-examination, or sent directly on to the overall VSP host computer for further processing. Then the "match greater than threshold" value is examined for the next set bit, if any, and the result processing operation loops until all matches have been processed for this offset. If necessary, the further main match processing operation of all the BACs must be held up (from generating a "dump accumulators" cycle) until all of the pending matches from the last offset have been processed.

The external controller also handles various other housekeeping details of the overall pattern matching process, such as, for example, holding off additional image input pixels until the current image data is complete.

FIG. 9 is e schematic diagram illustrating the principle of the BAC. Two image buffers 242 and 244 are shown, each being loaded with eight bits. A mask buffer 246 is loaded with eight bits from the mask. A search is done for an 8-bit string within the 16-bit field of buffers 242 and 244 which provides the closest fit to the mask bits. In the prior art, the contents of mask buffer 246 would be compared with the contents of a single image buffer 242. The contents of image buffer 242 would then be shifted eight times with a different bit being loaded into one end for each of the eight shifts.

In the BAC, the eight bits of buffer 242 are fed into an eight-bit comparator 242 and compared with the contents of mask buffer 246. Simultaneously, the last seven bits from buffer 242 and the first bit of buffer 244 are fed to a second comparator 250 and compared with the contents of mask buffer 246. Again, simultaneously the last six bits from buffer 242 and the first two bits from buffer 244 are fed to a comparator 252 and compared with the contents of mask buffer 246. Again, the last five bits of buffer 242 and the first three bits of buffer 244 are fed to a comparator 254. The combinations continue up to a last combination which compares all of the bits of buffer 244 with the bits of mask buffer 246. Thus, a comparison operation that required eight steps in the prior art is done in a single step in the present invention.

FIG. 10 is a schematic diagram of a preferred embodiment of the present invention. The circuitry implementing the functions of FIG. 10 can be incorporated on a single semiconductor chip. By using a sufficient number of identical chips, an entire image can be processed simultaneously in real time using traditional correlation techniques. More complex functions can also be performed in real time with a sufficient number of chips due to the ability of the chips to be cascaded. An image memory bus 256 provides 8 bits to an 8-bit image buffer 258. The contents of image buffer 258 can be shifted into a second 8-bit image buffer 260 upon an appropriate control signal. A mask memory bus 262 provides eight bits from the mask memory to a mask buffer 264. The mask and image busses could be the same physical bus, with data being sequentially supplied to buffers 258, 264.

The contents of buffers 258 and 260 are then fed to eight identical binary ALUs 266 in the manner set forth in FIG. 9. The contents of mask buffer 264 are also supplied to each of the binary ALUs 266. The output of each binary ALU is provided to a tally circuit 268. The output of each tally circuit 268 is supplied to an add-/subtract circuit 270. The output of each add/subtract circuit 270 is supplied to a 32-bit accumulator 272.

The outputs of each of the accumulators 272 is supplied to a sort circuit 274 which determines the greatest value among the eight accumulators 272 and stores this result in a register 276. The identity of the particular accumulator 272 which had the greatest value (n of 8) is supplied to a 3-bit register in an external controller. The value in register 276 is compared in a comparator 280 to a threshold value in a register 282. In addition, the value from register 276 is compared in a comparator 284 to best ever value in a register 286. Comparator 280 provides a value over threshold output 288 and comparator 284 provides a new best ever value output 290.

The implementation of the correlator chip diagram in FIG. 10 in a correlator system is shown in FIG. 11. A BAC 292 has the circuitry of FIG. 10. Image data is stored in an image RAM 294 and mask data is stored in a mask RAM 296. A bitplane area correlator BAC controller 298 controls the operation of BAC 292 and is itself controlled by a microprocessor 300. BAC controller 298 could be a microcode controller such as the AMD 29116 or a custom VLSI device.

The simplest operation which the correlator system performs is the comparison of a small binary test image (the mask) with another binary image. The mask is conceptually "laid over" the image, and the number of positions where the bit values in the mask match the bit values in the image are counted. When this number approaches the number of bits in the mask, a good match has been found. If this correlation operation is performed for every possible location of the mask over the image, then the result is an array of numbers representing the values of the match at each alignment.

Counting the number of bits which match is equivalent to performing a logical Not Exclusive OR operation between each pair of bits, and counting the number of "1" results. Other logical operations are possible: for instance, performing an exclusive OR operation counts the number of bits which do not match, while an AND operation counts the number of "1s" in the mask which match the "1s" in the image. The BAC is programmable for any of the possible sixteen logical operations between two pairs of bits.

If two separate binary masks are used, one pass of the correlator could count the number of "1s" which correspond between one mask and the image, while a second pass of the correlator could count the number of "0s" which correspond between the other mask and the image. The combined count provides a measure of the goodness of the match which may ignore some areas which are covered by the mask area. This allows masks to be programmed with "don't care" regions. (Such a "don't care" region might apply to the varying positions of the jaws of a crescent wrench which is being searched for.) By extension of this technique, sets of masks may be developed which apply varying "weights" to certain regions of the mask area.

The correlator can perform complex operations through a nesting of outer and inner loops. An outer loop is performed for a particular x, y offset of the image. The boolean operation to be performed by ALU's 266 is set. Add/Subtract circuits 270 are selected to do either addition or subtraction. The mask to be used is specified and the portion of an image to be compared is selected.

An inner loop is then run in which all the pixels of the portion of the image selected are compared to the selected mask in accordance with the functions selected in the outer loop. At the end of the loop, there is the option to shift the accumulator contents. Depending upon the program, several additional inner loops may be run with different function selections and the results added into the accumulators. The accumulator contents can then be compared and dumped, with the program then moving to the next x, y offset. For example, the accumulator might have the results of a 1's mask comparison to be added to the results of a 0's mask comparison. Or the results for the different powers of 2 in a grey scale match could be added in the accumulators with appropriate shifting to give the proper weights.

In some cases, it may be preferable to work in grey scale image space, rather than using binary images. In this case it is possible to build up a correlation result which is the sum of the products of the pixel values in corresponding positions in the mask and image by performing the multiplications bit by bit (binary long multiplication). This multiplication produces the largest overall values when the image and mask match. This allows the correlator to compute the convolution of a mask with an image, which may be used for certain pattern matching techniques.

A variation on this technique is to perform correlation between a binary image and a grey scale mask, or between a grey scale image and a binary mask. The BAC incorporates programmability to allow multiplication routines to be built up with any required precision of numbers of bits of image and mask planes independently.

The BAC contains 32 bit accumulators 272 in which the correlation results are computed for each mask image alignment. Eight such alignments are computed in parallel before the BAC continues with the next set of eight. A bitplane of an image is a binary image constructed from a single bit from each pixel in the original image. A correlator program specifies one or many steps in which a mask bitplane and an image bitplane are specified, together with a logical operation to apply between corresponding bit pairs. The resulting bits are counted, and the counts may either be added into or subtracted from the accumulators 272, or some other function may be performed. At the start of each program step, the previous value in the accumulators 272 may be shifted left by 0, 1 or more places to increase the significance of the preceding results. Finally at the end of the program sequence the BAC examines the eight new values which it has just computed, reports any good matches above the preset threshold, saves the highest match value of the entire image so far, and clears the accumulators 272 back to 0. It then continues by applying the same program to the next set of eight mask/image alignments, until the entire image has been covered. The BAC system operates in two phases per frame cycle. First the mask and image data is read into two areas of static memory 294 and 296 and stored (phase 1). In the second phase, the BAC address generation system accesses the mask and image memory to bring the required bytes into the BAC data path in the correct order (phase 2).

Both the mask and image data must be bitpacked. Each bitplane is packed separately, so that the bits from eight adjacent pixels on one row form the bits of one byte. This operation may be performed by a separate bit-packing circuit (not shown). If multiple bitplanes are to be packed, the bitpacker will interleave packed bytes from successive bitplanes, and the correlator will address the memory in rotation to store them in separate areas of memory.

In general, the mask data will be loaded once for several frames. This may be done via the microprocessor interface, if the processor has access to the mask data (for example, if it is precomputed and stored), or, alternatively, it may be loaded through the VSP pixel bus, if the mask data has originated from earlier VSP processing stages.

There are three modes of operation:

1. In the simplest mode, a complete frame is loaded at once and stored in the image memory. The correlator system then performs phase 2 in a single pass.

2. If the image memory is not large enough to hold all the image data in the required number of bitplanes, then phases 1 and 2 are interleaved. A few lines of the image are read and stored, the correlator operates upon those lines, a few more lines are read, and those are operated upon also, and so on. Here the pixel source is being halted between each group of lines being accepted by the correlator.

3. Another possibility is to use multiple correlators, each operating on a portion of the image in parallel. In this case, each correlator is programmed to grab a sub-range of the image lines and store them. The pixel source will stream the entire image without pause, and each correlator will load that portion which it has been programmed to accept. (There must be some overlap of the portions so that the mask can be applied in each possible location).

Multiple correlators may be applied in parallel by subdivision of the masks. If the image is to be correlated by several different masks, say of differing orientations or sizes of patterns, then each correlator can match the image against a different mask in parallel.

Referring back to FIG. 10, the operation of the correlator will now be described. Reference is made to the flowchart of FIG. 12, which gives the steps in a simple example of a correlation program. First, microprocessor 300 inputs a threshold value to register 282 (Step A). All other registers and the accumulators are cleared, the boolean function for ALU's 266 is selected, the Add-/Subtract control 304 is set and the mask and image portions to be matched are selected (Step B). The initial two bytes are transferred from the image memory 294 into registers 258 and 260 (Steps C and D). On subsequent loadings, only a single byte is loaded into register 260 with the byte already in register 260 being shifted into register 258. This enables the sequencing through the bytes of an image as illustrated in FIG. 9. Eight mask bits are loaded into buffer 264 (Step E). Controller 300 provides image valid and mask valid signals to buffers 258, 260, and 264. The image valid and mask valid signals enable the data on input lines 256 and 262 to be input into the respective buffers. Separate valid signals are used to allow the extra image byte to be input. The mask valid input can also be used to enable accumulators 272 after a required delay to ensure that only results from valid pairs of masks and images are added into or subtracted from the accumulators.

The sixteen bits of image data and the eight bits of mask data are routed to eight 8-bit universal boolean ALUs 266 (Step F). The eight pairs represent successive offsets of the mask data against the image data. The boolean function to be performed is determined by the four-bit ALU function control signal 302. A simple example would be to perform a Not Exclusive OR function (Step G).

One clock cycle after the data buffers 258, 260 have a new set of valid data, each boolean ALUs 266 will present an output corresponding to the boolean function applied to the pair of eight-bit inputs.

Eight tally circuits 268 then accept the eight bits from the ALU's and produce a four-bit result which is a count of the number of "1" value bits in each tally input (Step H).

On each cycle, the four-bit tally result is added to (or subtracted from) the existing 32-bit value through adding/subtract circuitry 270 and the result is latched back into the accumulator at the end of the cycle (Step I). The 32-bit values contained in accumulator 272 represent signed, two's complement numbers. The add-/subtract ALU function is determined by an add/subtract control input 304 from BAC controller 298 of FIG. 11.

An accumulator shift control signal 306 from BAC controller 298 can shift the accumulator value left or right to alter the relative significance of the results. When control signal 306 is asserted for a left shift, each accumulator will shift left on each clock tick, with zeroes being clocked in to fill the least significant bits. The combination of the shift and add/subtract capabilities enables a number of functions to be performed, including multiplication.

A control signal 308 signals sort circuit 274 to start a statistics operation. Unlike the preceding stages, the statistic operation does not occur on every clock cycle. The statistics operation might occur, for example, only after all the pixels of an image and a particular mask have been compared (Step J), or after several masks have been compared. Using the value of the eight accumulators from the previous cycle, a sort is performed to determine which has the maximum two's complement value (even if some or all are negative) (Step K). This value is preserved in a best-of-eight register 276 and its position (n out of eight) is supplied to BAC controller 298. A control signal 308 is input to the eight accumulators to reset them to zero. This can be done either after a portion of an image has been processed or after the whole image has been processed (as in FIG. 12).

The value in greatest-of-eight register 276 is compared to a value in threshold register 282 (Step L). The threshold register value has been previously loaded by microprocessor 300. If the greatest-of-eight register value is greater than the threshold value, comparator 280 will indicate this on output line 288 to BAC controller 298. An interrupt signal could then be supplied to microprocessor 300 by BAC controller 298 to indicate that the microprocessor should interrogate the correlator to determine the values of this match and to determine the position where it occurred. Alternately, the controller 298 might only interrupt microprocessor 300 when a best ever match is obtained after processing all masks. Thus, controller 298 can serve to greatly reduce the number of required interrupts to microprocessor 300 due to the unique configuration of the BAC.

In parallel to the threshold comparison, the greatest-of-eight value from register 278 is also compared in comparator 284 to a best ever value in register 286. The initial value from register 276 is simply loaded into register 286. Thereafter, subsequent values from register 276 are compared to the value remaining in register 286 (Step L). If the value from register 276 is greater, it is then substituted for the previous value of register 286. When comparator 284 indicates that the new best ever value is obtained, a new best output signal 290 is provided to BAC controller 298. The new best ever value 291 is readable upon demand from the best ever register 286. When a new best ever value is loaded into register 286, the position of this value from the n of 8 signal can be loaded into an overall best position register (not shown) in BAC controller 298. Controller 298 is thus signaled that a new best position has been established and this information can then be provided to microprocessor 300 by controller 298.

The best position could, for example, correspond to a particular mask, with one sort being done for each mask. If another mask is to be compared, the process is repeated (Step M) and a new value can be compared to the previous best. Referring back to FIGS. 7 and 7A, in one example the best of 8 value gives the horizontal or vertical position with the best match (FIG. 7A) and the best ever value gives the mask for which the best fit of this best horizontal or vertical shift is obtained.

FIG. 13 shows a generalized version of the flow chart of FIG. 12. Steps A-M are the same as for FIG. 12 except that in Step G any ALU operation may be performed and in Step I the tally result may be either added to or subtracted from the accumulator value. In addition, more than one image plane may be compared (Step N), such as for a grey scale comparison or where more than one image is being compared. The accumulators would then be shifted to give an appropriate weight to the particular bit plane to be processed (Step O). The designated ALU operation can be altered and the mask and image pointers are set to the appropriate bit plane (Step P). Instead of simply comparing one mask to a particular portion of an image as in FIG. 12, it may also be desirable to compare more than one mask pattern to a particular portion of an image (Step Q).

Referring now to FIG. 11, the system shown has a standard visual signal processing (VSP) eight-bit microprocessor data bus interface 311 which is channeled through BAC 292 and then supplied to Image RAM 294 and Mask RAM 96. BAC 292 thus acts like a frame buffer and eliminates the need for an external multiplexer. The microprocessor 300 can load the value of the threshold register along bus 312, which could be the same as data bus 311. Microprocessor 300 can also read the outputs of an overall best register and associated position register in BAC controller 298 as well as best-of-eight register and associated position register.

The system shown in FIG. 11 can be configured and programmed in a number of different ways and can utilize a variety of correlation techniques. The section entitled "Description of Correlation Techniques" below describes a number of possible correlation techniques which could be used by the method and apparatus of the present invention.

An example of a total VSP system incorporating the present invention is shown in FIG. 14. The VSP system consists of several sections: an averaging frame buffer 314, a filtering section 316, an averaging down circuit 318, an edge detector 320 to convert to edge space, a threshold and binary bit packer 322, and finally an array of sixteen BAC's 324 for edge space pattern recognition.

The incoming pixels from a camera 326 are first converted to digital eight bit grey scale values by an A/D converter 328, and then streamed first by a histogram unit 330. Based upon the image energy statistics gathered by histogram 318, a look-up table 332 will be loaded with the appropriate transformation function for the raw pixel data to stream through. (The look-up table is updated after each frame of image goes by.) After look-up table 332, the pixels stream through an ALU 334 and into a frame buffer 336. ALU 334 allows successive camera frames to be added together to improve the signal to noise ratio.

The output of averaging section 314 enters two filters: a median filter 338; and a 3×3 convolver 140 programmed as an image smoothing filter. Note that both filters require a digital line delay 342 to operate. The pixel stream is histogrammed again for control feedback purposes. The overall purpose of filter section 316 is to smooth and condition the image in preparation for the later stages of processing.

Next the averaged filtered image is passed through two average down circuits 344. Because these circuits can be disabled and placed into a pass through mode, this average down section can be programmed to reduce its input image by 1×1 (none), 2×2, or 4'4 (normal). The intention is to once again increase the signal to noise ratio, as well as make a smaller image for the upcoming search. (Note, for area operations, two digital line delays 346 are used in conjunction with the 2×2 average down.)

The reduced image is converted into edge space by sending it through a convolver 348 programmed as an edge operator. (Many times several convolvers are placed in parallel to look for edges of different tuned directions in parallel, with their results summed into a common stream again). Yet another histogram is taken to measure now the edge space energy. The image is converted into edges so as to divide out the effects of uneven illumination and minor surface details.

The edge space image is finally thresholded to binary pixels (all pixels have been 8 bit grey scale until now) by a look-up table and bit packer 350, and the binary pixels are packed eight per byte and sent on to a second frame buffer 352. This binary packing operation is needed to convert the image data into the form that the upcoming correlation section needs.

The final stage is the array of BACs 292 themselves. Correlator controller 298 will now sequence the input image out of frame buffer 352, multiplex it through the BAC chips 292 themselves, and into local static RAMs 353. Controller 298 then sequences image bits from static RAMs 353 and masks (patterns) from static RAMs 355 into the BACS 292 in parallel. The purpose of the correlation section is to match pre-stored pattern images with the incoming images. The results of these matches can be applied in many ways.

This final stage is the most complex and the most programmable. Depending upon how the applications programmer has programmed the BAC sequencer, the sixteen BACs can perform any number of complex recognition tasks. A simple example from the semiconductor industry might involve the matching of pre-stored images of portions of semiconductor die to the incoming image to provide final alignment for a wire bonding machine for die bonding. A more complex task may involve matching instances of good chips with the incoming images in an in-processes wafer inspection machine.

DESCRIPTION OF CORRELATION TECHNIQUES

The VSP (Visual Signal Processing) component family is a group of VLSI integrated circuits for image processing and computer vision. It is based on a pixel serial architecture. A stream of pixels flows from component to component, undergoing processing at each stage. The pixel stream is communicated in parallel, typically 8 bits wide, with three handshaking lines. Each component has an interface to a microprocessor, which has the task of initialising and controlling the operation of that component, and of controlling the overall vision task. The BAC (Bitplane Area Correlator) is a member of this family, intended for various correlation tasks.

2: CORRELATION

Consider two functions F(i,y) and G(i,y); Let f(i,y) be an arbitrary patch of F, defined across an area $A = X \times Y$, such that $f(i,y) = F(i+i_0, y-y_0)$. Similarly let g(i,y) be an arbitrary patch of G, defined across the same area A, such that $g(i,y) = G(i+i_1, y-y_1)$. In some applications, function g is fixed, and represents a model for a particular feature whose presence or absence is to be determined. In this case, the patch f is scanned across the entire function F, and the difference between f and g is evaluated everywhere. At those points where the difference is small enough, the feature is said to have been found. In other cases, both functions f and g may vary, for example where functions F and G are different images of the same scene, and stereo matching is being performed. Here interesting features in F are located within the domain of f, and sought within G by scanning g across the whole, or a part of, G.

Cross Correlation.

There are many ways to calculate the difference between two such functions f and g; for example:

$$d_1 = \max |f - g|_A \quad (2.1)$$

$$d_2 = \int_A |f - g| \, dx \, dy \quad (2.2)$$

$$d = \int_A (f - g)^2 \, dx \, dy \quad (2.3)$$

The last of these three forms the basis of most correlation systems. If we multiply out the square in this expression for d we get:

$$d = \int_A f^2 \, dx \, dy + \int_A g^2 \, dx \, dy - 2 \int_A fg \, dx \, dy \quad (2.4)$$

The last item is called the cross correlation coefficient:

$$R_{fg} = \int_A fg \, dx \, dy \quad (2.5)$$

If the first two terms are constant:

$$\int_A f^2 \, dx \, dy = k_1 \quad (2.6)$$

$$\int_A g^2 \, dx \, dy = k_2 \quad (2.7)$$

then clearly the cross correlation is a negative measure of the distance between the functions f and g:

$$R_{fg} = \frac{k_1 + k_2 - d}{2} \quad (2.8)$$

When the distance d is zero, the value of $R_{fg}$ is at its maximum of $\frac{1}{2}(k_1 - k_2)$. For larger distances, Rphd fg is smaller.

Correlation of discrete images.

Since the VSP components work with discrete digital images, we must use a discrete version of the cross correlation coefficient:

$$R_{fg} = \sum_y \sum_z f[x, y] g[x, y] \quad (2.9)$$

A similar discrete version of each of the following equations can also be derived.

Normalised Correlation.

In many cases, the simple cross correlation $R_{fg}$ is not suitable, as the other terms in the distance equation are not constant for each position in which correlation is applied. One alternative is to use normalised correlation. This may be derived from the Cauchy-Schwartz inequality, which states:

$$\int_A fg\, dx\, dy \leq \qquad (2.10)$$

$$\left( \int_A f^2\, dx\, dy \int_A g^2\, dx\, dy \right)^{\frac{1}{2}}$$

Further, the equality holds iff f=c.g where c is a constant. (See appendix I for a derivation). Rearranging, we see that:

$$\frac{\int_A fg\, dx\, dy}{\left( \int_A f^2\, dx\, dy \int_A g^2\, dx\, dy \right)^{\frac{1}{2}}} \leq 1 \qquad (2.11)$$

We use this to define the normalised correlation coefficient:

$$N_{fg} = \frac{\int_A fg\, dx\, dy}{\left( \int_A f^2\, dx\, dy \int_A g^2\, dx\, dy \right)^{\frac{1}{2}}} \qquad (2.12)$$

$$= \frac{R_{fg}}{\left( \int_A f^2\, dx\, dy \int_A g^2\, dx\, dy \right)^{\frac{1}{2}}} \qquad (2.13)$$

$N_{fg}$ reaches the value of 1 only when function f is a constant multiple of function g. When the functions mismatch perfectly, that is f=−c.g, if we take the positive square root, $N_{fg} = -1$.

Since $N_{fg}=1$ whenever f=c.g, the relative contrast between the functions does not affect the correlation value.

Normalised Correlation of Variations from the Mean.

Another correlation metric, also sometimes referred to as normalised correlation, uses the differences between the functions f and g and their means $\bar{f}$ and $\bar{g}$.

Let $$f^1 = f - \bar{f} \qquad (2.14)$$

$$g^1 = g - \bar{g} \qquad (2.15)$$

where $$\bar{f} = \frac{\iint_A f\, dx\, dy}{\iint_A 1\, dx\, dy} \qquad (2.16)$$

$$\bar{g} = \frac{\iint_A f\, dx\, dy}{\iint_A 1\, dx\, dy} \qquad (2.17)$$

We can now define this coefficient as:

$$M_{fg} = \frac{\iint_A f' g'\, dx\, dy}{\left( \iint_A f'^2\, dx\, dy \int_A g'^2\, dx\, dy \right)^{\frac{1}{2}}} \qquad (2.18)$$

This coefficient also has a maximum value for a perfect match, $M_{fg}=1$ and for a perfect mismatch, $M_{fg}=-1$.

Since this measure normalises out both the absolute intensity and the contrast of the two functions, the value calculated is entirely due to the shapes in the two functions. If either of the functions has no contrast at all, then any shapes will be indeterminate. Since this would mean that $f=\bar{f}$ or $g=\bar{g}$, we would have $f^1=O$ or $g^1=O$ and $M_{fg}=O/O$. This can often be the case, especially when images contain uniformly shaded regions, and must be handled by a special test.

Pseudo Normalised Correlation.

Moravec[1], in an effort to improve the characteristics of $M_{fg}$, derived from it a measure which he termed pseudo normalised correlation.

1. Moravec, Robot Rover Visual Navigation, UMI. pp 105..108.

Approximately the denominator of equation 2.18 by $$\left( \int_A f'^2\, dx\, dy \int_A g'^2\, dx\, dy \right)^{\frac{1}{2}} \approx \qquad (2.19)$$

$$\frac{1}{2} \left( \int_A f'^2\, dx\, dy + \int_A g'^2\, dx\, dy \right)$$

we see that the approximation is exact when $$\int_A f'^2\, dx\, dy = \int_A g'^2\, dx\, dy \qquad (2.20)$$

when both sides become $$\int_A f'^2\, dx\, dy \qquad (2.21)$$

As the two integrals differ more and more, the new denominator based on their mean is increasingly larger than the previous denominator based on the root of their product. We define pseudo normalised correlation replacing the denominator of equation 2.18 by this approximation:

$$P_{fs} = \frac{2 \int_A f'^2 g'^2\, dx\, dy}{\int_A f'^2\, dx\, dy + \int_A g'^2\, dx\, dy} \qquad (2.22)$$

This is close to the normalised correlation coefficient $M_{fg}$ only when the integrals in the denominator are similar. As the integrals in the denominator become more different, the coefficient $P_{fg}$ becomes smaller than the value of $M_{fg}$. This means that the new coefficient is insensitive to small contrast changes, but when contrast changes become large, it will have a reduced value, even if the shapes in the two patches of image and mask are still identical. In particular, when either one of the integrals in the denominator becomes zero, the denominator does not become zero; however, if one of the functions is zero at every point, the numerator will be zero, so the coefficient will also be zero.

This coefficient is also much easier to compute than the conventional normalised correlation coefficients, as it does not involve a square root.

In discrete form, this yields the pseudo normalised correlation coefficient described by Moravec:

$$P_{fs} = \frac{2 \sum_y \sum_z f[x, y] g'[x, y]}{\sum_y \sum_z (f'[x, y])^2 + \sum_y \sum_z (g'[x, y])^2} \qquad 2.23$$

3: BINARY CORRELATION

In some cases, image data can be reduced to a single bit binary form. This allows some important simplification in the computation of correlations, in various different ways. Initially, image data is considered to be binary with values 1 and −1. Subsequently more conventional binary numbers are used, with the values 1 and 0.

Introduction to Binary Correlation

In certain circumstances, the extra computation required to computer one of the normalised correlation coefficients is not required, because the first two terms of equation 2.4 are constant:

$$\int_A f^2 \, dx \, dy = k_1 \qquad 3.1$$

$$\int_A g^2 \, dx \, dy = k_2 \qquad 3.2$$

One such case is when the functions are binary valued, with values of −1 or 1. Clearly, in this case, $f^2$ and $g^2$ will always have the value 1, and $$k_1 = \int_A f^2 \, dx \, dy = \int_A 1 \, dx \, dy = A \qquad 3.3$$

$$k_2 = \int_A g^2 \, dx \, dy = \int_A 1 \, dx \, dy = A \qquad 3.4$$

Thus in this case, the cross correlation coefficient of equation 2.5 can be used as an indication of the degree of match. Substituting back into equation 2.4, $$R_{fs} = \frac{2A - d}{2} \qquad 3.5$$

For a perfect match, d=0 and $R_{fg}$ takes it maximum value of A, and for a perfect mismatch, f=−g and $R_{fg}$=−1.

Two Pass Binary Correlation.

In order to calculate $R_{fg}$ as above, multiplications have to be performed. It is possible to achieve the same effect using basic logical operations, such as AND, OR and XOR, which allows simpler hardware to be used.

We now consider binary valued equations with values 0 and 1. The first method, after Rosenfeld and Kak[2], is useful where the function g is a fixed mask function. We use two versions of this mask, function, g is the original, while $\bar{g}$ is a complemented version, where $\bar{g}=1-g$.

[2]. Rosenfeld, A. and Kak, AC. Digital Picture Processing. Academic Press.

We now compute $$\iint_A fg \, dx \, dy \qquad 3.6$$

in one pass, and subtract from it $$\iint_A f\bar{g} \, dx \, dy \qquad 3.7$$

computed in a second pass.

Since the functions have values of 0 or 1 only, multiplication is equivalent to the logical AND operation, which can be performed very simply in hardware.

We compute:

$$C_1 = \iint_A fg \, dx \, dy - \iint_A f\bar{g} \, dx \, dy$$

$$= \iint_A f(g - \bar{g}) \, dx \, dy$$

Since $\bar{g}=(1-g)$, $$C_1 = \iint_A f(2g - 1) \, dx \, dy$$

$$= 2 \iint_A fg \, dx \, dy - \iint_A f \, dx \, dy$$

Now f has only values of 0 or 1, so $f=f^2$, thus:

$$C_1 = 2 \iint_A fg \, dx \, dy - \iint_A f^2 \, dx \, dy \qquad 3.12$$

We have now computed the first and third terms of the distance function d of equation 2.4. Since the function g is a fixed mask, the second term is constant:

$$\iint_A g^2 \, dx \, dy = k_2 \qquad 3.13$$

and thus $C_1$ is a valid measure of the match between the two functions. Substituting back into equation 2.5, $$C_1 = k_2 - d \qquad 3.14$$

For a perfect match, $C_1$ takes its maximum value of $k_2$, and for a perfect mismatch $f=\bar{g}=(1-g)$, so $fg=0$ and:

$$C_1 = -\iint_A f^2 \, dx \, dy \qquad 3.15$$

Single Pass Binary Correlation

A better method of computing a binary correlation coefficient uses the XOR operation. Using the same notation where $\bar{f}$ is the complement of f:

$$C_2 = \int\int_A (f \text{ XOR } g) \, dx \, dy$$

$$= \int\int_A ((f \text{ AND } \bar{g}) \text{ OR } (\bar{f} \text{ AND } g)) \, dx \, dy$$

Noticing that the AND operation is equivalent to a multiply, and since both sides of the OR function cannot be 1 at the same time, the OR function is equivalent to addition, we can rewrite this using more conventional operators:

$$C_2 = \int\int_A (f(1-g) + (1-f)g) \, dx \, dy$$

$$= \int\int_A (f + g - 2fg) \, dx \, dy$$

As above, $f = f^2$ and $g = g^2$, so:

$$C_2 = \int\int_A f^2 \, dx \, dy + \int\int_A g^2 \, dx \, dy -$$

$$2 \int\int_A fg \, dx \, dy = d \quad 3.20$$

This is exactly the original distance measure d of equation 2.5 from which we started; here $C_2$ has a minimum value of 0 for a perfect match, and a maximum value of A, where there is mismatch at every point across the patch.

Another way of understanding this operation, is to remember that the XOR function has the value 1 only when the two functions differ, thus we are integrating or counting the mismatched points between the two functions.

This measure has a low value for a good match; in many cases this is desirable, as it means that the threshold below which we consider the computation to have found a good match is always near zero, and does not have to be recalculated for every small change in patch size.

It may be simpler to use hardware configured to find a maximum value; in this case, we can use a similar measure based on the NXOR function. By a similar argument:

$$C_3 = \int\int_A (f \text{ NXOR } g) \, dx \, dy$$

$$= \int\int_A ((f \text{ AND } g) \text{ OR } (\bar{f} \text{ AND } \bar{g})) \, dx \, dy$$

$$= \int\int_A (fg + (1-f)(1-g)) \, dx \, dy$$

$$= \int\int_A (2fg - f - g + 1) \, dx \, dy$$

As above, $f = f^2$ and $g = g^2$, so:

$$C_2 = 2 \int\int_A fg \, dx \, dy - \int\int_A f^2 \, dx \, dy - \int\int_A g^2 \, dx \, dy - A$$

$$= A - d$$

This function has the maximum value of A for a perfect match, and has the minimum value O when there is mismatch at every point across the functions.

Note that both the XOR and the NXOR measures are computed in a single pass, and use a basic logical operation which is easily provided by simple hardware. Also no complemented function is used, so these measures are more suitable for auto correlation, or correlation of two stereo images, for example.

3: PATTERN MATCHING WITH WEIGHTED REGIONS

In the previous section two passes of correlation computation were used to compute the coefficient $C_1$, using two different masks, g and $\bar{g}$. In this section the idea of using multiple passes to compute parts of the result will be extended to allow computation of correlations where different regions of the correlation overlap patch have different weights, or importances. In one particular case, for example, it is possible to weight part of the correlation patch with a weight of zero, so that the value of the data in that region has no effect on the correlation result, that is, it is a "don't care" region. In other cases, it is possible to weight regions within which the data is considered to be of great importance with a high weight, to increase their significance in the final result.

The BAC is able to compute one or several successive passes of computation, where each pass represents a single boolean operation between two patches of binary data. The boolean operation may be changed between operations. The image data is considered as a set of bitplanes, and the binary patches are typically a region of a bitplane. The patches may be changed, but represent the same spatial extent of the basic image data. The partial results computed at each pass may be added or subtracted from the accumulating value. With this in mind, we can develop some methods for achieving weighted region correlation.

Binary Correlation Within a Enabled Region.

If the feature which is being correlated does not fit exactly within a rectangular region, then simple correlation as described above has problems. If the feature is truncated, then the correlation could ignore vital features, but if the rectangular patch is increased to surround the feature, then the nature of the background against which the feature is observed will influence the value of a correlation computed. Here we develop a technique for correlating within an arbitrarily shaped patch. Consider two binary functions f and g, defined as previously as patches of area $A=X^2Y$ of two functions F and G. Consider also an enabling function e, which is a binary function defined over the same area $A=X^2Y$. This function has a value of 1 within the area of interest, and 0 outside. For example, if we wished to perform a correlation against some circular feature, the enabling function would contain a circular region with value 1 centred within the square patch.

We now compute the binary correlation coefficient as in equation 3.16, masking the result with the enabling function e.

$$C_4 = \int\!\int_A ((f\ XOR\ g)\ AND\ e)\,dx\,dy \qquad 4.1$$

Wherever the two functions f and g are not the same and the enabling function is 1, the value 1 is contributed to the integration. Outside the enabled region, there are no contributions to the result. Thus this coefficient is a measure of the distance between the two functions f and g only within the region enabled by the enabling function e.

However, since the BAC cannot perform operations between three functions simultaneously, this must be transformed into a multiple pass form in order to be useful.

Expanding the XOR function, as before:

$$C_4 = \int\!\int_A (((f\ AND\ \bar{g})\ OR\ (\bar{f}\ AND\ g))\ AND\ e)\,dx\,dy \qquad 4.2$$

$$= \int\!\int_A ((f\ AND(\bar{g}\ AND\ e))\ OR\ (\bar{f}\ AND(g\ AND\ e)))\,dx\,dy \qquad 4.3$$

Applying De Morgan's theorem, $$C_4 = \int\!\int_A ((f\ AND\ (\bar{g}\ AND\ e))\ OR\ (f\ NOR(g\ NAND\ e)))\,dx\,dy \qquad 4.4$$

If function g is a predetermined function representing a particular feature which is being sought in the image f, then the following functions can be precomputed:

$$g_1 = \bar{g}\ AND\ e \qquad 4.5$$

$$g_2 = g\ NAND\ e \qquad 4.6$$

For the left hand side to be 1, we require d 32 1, and the right hand side to be 1, f=1, so both sides cannot be 1 at the same time, in which case the OR function may may be represented by addition, which may be taken outside the integration:

$$C_4 = \int\!\int_A (f\ AND\ g_1)\,dx\,dy + \int\!\int_A (f\ NOR\ g_2)\,dx\,dy \qquad 4.7$$

This is a form which can be evaluated in two passes, and in which only a single version of the image function f appears.

Note that $g_1$ is 1 where the model function g is 0 within the enabled region, and $g_2$ is 0 where the model function is 1 within the enabled region. The first term of the expression in 4.7 contributes wherever the image function g has a 1 value which should be 0, and the second term contributes wherever the image function is 0 and should be 1. Neither term contributes outside the enabled region.

$$C_4 = d^1 \qquad 4.8$$

where $d^1$ is the distance function evaluated only within the enabled region. When there is perfect match within the enabled region, $C_4=0$, and for perfect mismatch, $C_4=A^1$, where $A^1$ is the area of the enabled region.

The same manipulation can be performed with the NXOR form of the binary correlation (equation 3.21).

$$C_5 = \int\!\int_A ((f\ XNOR\ g)\ AND\ e)\,dx\,dy \qquad 4.9$$

$$= \int\!\int_A (\bar{f}\ AND(\bar{g}\ AND\ e))\ OR \qquad 4.10$$

$$(f\ AND(g\ AND\ e))\,dx\,dy \qquad 4.11$$

$$= \int\!\int_A (f\ AND(g\ AND\ e))\ OR$$

$$(f\ NOR(\bar{g}\ NAND\ e))\,dx\,dy$$

Let:

$$g_3 = g\ AND\ e \qquad 4.12$$

$$g_4 = \bar{g}\ NAND\ e \qquad 4.13$$

Then:

$$C_5 = \int\!\int_A (f\ AND\ g_3)\,dx\,dy - \int\!\int_A (f\ NOR\ g_4)\,dx\,dy \qquad 4.14$$

$$= A^1 - d^1 \qquad 4.15$$

Multiple Weighted Regions

In the section above, use of a single enabling region was discussed. This technique can be generalised to include multiple regions, and various weights, or importances.

Consider a set of enabling functions $(e_a, e_b, \ldots)$, each defined over the same area $A=X*Y$, and a set of corresponding weights $(W_a, W_b,)$. It is possible to perform correlation within each weighted region, as in the previous section, multiplying the partial results at each pass by the weighting factor, so that the final result is a combination of results from various regions or the correlation patch, with differing importances attached to each. Typically the enabling regions will be non overlapping, and often there will be part of the correlation patch which is not covered by any of the enabling regions, which therefore, is a "don't care" region.

We can compute:

$$C_6 = W_6 \int\!\int_A ((f\ XOR\ g)\ AND\ e_a)\,dx\,dy \qquad 4.16$$

$$- W_b \int\!\int_A ((f\ XOR)\ AND\ e_b)\,dx\,dy$$

$$- \cdots$$

Precomputing functions:

$$g_{1a} = \bar{g}\ AND\ e_a \qquad 4.17$$

$$g_{2a} = g\ NAND\ e_a \qquad 4.18$$

$$g_{1b} = \bar{g}\ AND\ e_b \qquad 4.19$$

$$g_{2b} = g\ NAND\ e_b \qquad 4.20$$

and so on, we can perform the correlation in 2N passes, where N is the number of regions:

$$C_6 = W_a(\int\int_A(f \text{ AND } g_{1a})dx\,dy +$$
$$\int\int_A(f \text{ NAND } g_{2a})dx\,dy)$$
$$+ W_b(\int\int_A(f \text{ AND } g_{1b})dx\,dy +$$
$$\int\int_A(f \text{ NAND } g_{2b})dx\,dy)$$
$$+ \ldots$$

(4.21)

Multiplication by a weighting factor on the BAC is limited to shifting the existing results of the previous passes of the computations left by zero or more places. Therefore coefficients must be in powers of 2, and are ordered with the pass corresponding to the largest coefficient performed first. At the end of each pass, the accumulated value is shifted by the difference between the power of two of the result just computed, and the power of two for the next result.

5: GREY SCALE CORRELATION WITH THE BAC

In section 2 some general correlation equations were derived. In sections 3 and 4 these were developed for use on the BAC with binary images. In this section a method for applying the BAC to correlation with non binary data will be developed.

Consider now functions f and g which are patches of functions F and G, which have some integer value, which can be represented by a group of binary bits. The functions f and g can be considered as being made up of a set of binary "bitplanes":

$$f = f_0 + 2^1 f_1 + 2^2 f_2 + \ldots + 2^N f_N \qquad 5.1$$

Taking the cross correlation coefficient of equation 2.5, and expanding it using bitplane notation:

$$R_{fg} = \int\int_A((f_a + 2f_1 + \qquad 5.2$$
$$\ldots + 2^N f_N)(g_0 + 2f_1 + \ldots + 2^M g_M))dx\,dy$$
$$= \int\int_A(f_a g_a + 2f_{1g_a} + 2f_{ag_1} + 4f_{1g_1} + \ldots$$
$$-2^{(n-m)} f_n g_m + \ldots + 2^{(N+M)} f_N g_M) dx\,dy \qquad 5.3$$

Taking the additions outside the integrations:

$$R_{fg} = \int\int_A(f_0 g_0) dx\,dy + \qquad 5.4$$
$$2\int\int_A(f_1 g_0) dx\,dy +$$
$$2\int\int_A(f_0 g_1) dx\,dy +$$
$$4\int\int_A(f_1 g_1) dx\,dy + \ldots$$
$$-2^{(n+m)}\int\int_A(f_n g_m) dx\,dy +$$
$$2^{(N+M)}\int\int_A(f_N g_M) dx\,dy$$

Remember that $f_1$ and $g_1$ are boolean functions, multiplication is equivalent to the AND operation, so this equation is now in a form in which it can be computed by the BAC in $N \times M$ passes, where N is the number of non zero bitplanes in function f, and M is the number of non zero bitplanes in g. Clearly arbitrary precision can be achieved, at the expense of number of passes.

APPENDIX I: DERIVATION OF THE CAUCHY-SCHWARTZ INEQUALITY.

Consider the following polynomial in z:

$$p(z) = (\int\int f^2) z^2 + (\int\int fg) z + (\int\int g^2) \qquad 1.1$$
$$= \int\int (fz - g)^2 \qquad 1.2$$

For real valued $z_1$, the square will always be non negative, and so the polynomial must also be greater than or equal to zero.

$$\int\int (fz - g)^2 \geq 0 \qquad 1.3$$

Since p(z) is a quadratic in z, and is greater than or equal to zero for all real values of z, it must have either no real roots, or exactly one double root. That is, its discriminant must be less than or equal to 0:

$$4(\int\int fg)^2 - 4\int\int f^2 \int\int g^2 \leq 0 \qquad 1.4$$

$$\int\int fg \leq \sqrt{\int\int f^2 \int\int g^2} \qquad 1.5$$

Further, if the equality holds as well as the inequality, then the discriminant is zero, giving the double root of the polynomial:

$$p(z_0) = 0 \qquad 1.6$$
$$= \int\int (fz_0 + g)^2 \qquad 1.7$$
$$fz_0 = -g \qquad 1.8$$
$$f = \frac{-1}{z_0} g \qquad 1.9$$

Since $z_0$ is the unique double root of the polynomial, it is constant, so we have:pos
$$f = cg \qquad 1.10$$

Thus only when one function is a constant multiple of the other does the equality hold.

As will be understood by those familiar with the art, the present invention may be embodied in other specific forms without department from the spirit or essential characteristics thereof. For example, the image of FIG. 1 could be divided along the y-axis rather than the x-axis, or the state machine of FIG. 5 could be other than RAM-based, or any number of other component changes could be made. Accordingly, the disclosure of the preferred embodiment of the invention is intended to be illustrative, but not limiting, of the scope of the invention which is set forth in the following claims.

I claim:

1. A controller for a plurality of image correlation circuits, each correlation circuit having a memory for storing a portion of a source image to be correlated with a pattern, each said memory having a portion of its address inputs coupled to a common address bus, comprising:

means for generation correlator addresses by adding a predetermined increment to said correlator address while controlling the most significant bit of said correlator addresses, said correlator addresses corresponding to source image addresses with at least one of the most significant bits altered, a portion of each said correlator address being transmitted on said common address bus, said correlator addresses being used for loading said memories so that portions of said source image having different source image addresses with have the same correlator addresses;

first control means for sequentially enabling said memories, said first control means being programmable so that more than one memory can receive said correlator addresses at one time to load overlapping portions of said source image in said memories; and means for generating correlator addresses for a correlation operation such that a portion of said image corresponding to the size of said pattern is accessed, said means for generating correlator addresses including at least one register, an arithmetic logic unit having a first input coupled to an output of said register, and an accumulator having an input coupled to an output or said arithmetic logic unit and an output coupled to a second input or said arithmetic logic unit.

2. A method for correlating a plurality of overlapping portions of an image to a pattern using a plurality of correlators, each correlator having a memory, said memories having a common address bus for a first portion of the address bits for said memories, comprising the steps of:

enabling a first memory;

loading a first portion of said first memory with a first portion of said image by providing address bits on said common address bus;

enabling a second memory;

loading a second portion of said first memory and a first portion of a second memory simultaneously with a second portion of said image by providing identical address bits on said address bus, providing a second portion of an address to said first memory for at least one higher order address bit, and providing an altered version of said at least one higher order address bit to said second memory so that said second portion of said image is loaded into said first portion of said second memory;

disabling said first memory;

enabling a third memory;

loading a second portion of said second memory and a first portion of said third memory simultaneously with a third portion of said image by providing identical address bits on said address bus, providing a second portion of an address to said second memory for at least one higher order address bit, and providing an altered version of said at least one higher order address bit to said third memory so that said third portion of said image is loaded into said first portion of said third memory;

completing the loading of said memories;

enabling all of said memories; and providing identical addresses to all of said memories for simultaneous comparison of the contents of said memories to said pattern by said correlators.

3. A method for comparing a pattern to a plurality of portions of an image, data representing said portions having been loaded into a plurality of memories in accordance with claim 2, said data being loaded into said memories at addresses such that each element of a column is sequenced through before the next column is reached as said addresses are linearly incremented, said pattern being smaller than said portions, comprising the steps of:

(a) providing a first address for said memories;

(b) sequentially incrementing the address of said memories by a value equal to a height of said image for a number of times equal to a number of bytes in a first dimension of said pattern plus one;

(c) incrementing the address of said memories by one less the number of bytes in said first dimension of said pattern multiplied by said image height;

(d) repeating steps (b)-(c) for a number of times equal to a second dimension of said pattern.

4. A controller for a plurality of image correlation circuits, each correlation circuit having a memory for storing a portion of an image to be correlated with a pattern, said memories having a common address bus for a portion of the address inputs for said memories, comprising:

first control means for sequentially enabling said memories, said first control means being programmable so that two memories can receive the same data simultaneously to load overlapping portions of said image in said two memories;

second control means for altering at least one higher order address bit for one of said two memories so that said data is loaded into a second portion of one of said two memories and into a first portion of the other of said two memories; and third control means for generating identical correlator addresses for all of said memories simultaneously for a correlation operation.

5. The controller of claim 4 wherein said second control means comprises means for altering the most significant bit of said image addresses such that said correlator addresses are repeated.

6. The controller of claim 4 wherein said third control means comprises:

at least one register;

an arithmetic logic unit having a first input coupled to an output of said register; and an accumulator having an input coupled to an output of said arithmetic logic unit and an output coupled to a second input of said arithmetic logic unit.

7. The controller of claim 4 wherein said pattern is stored in a pattern memory and the controller further comprises a counter for addressing said pattern memory.

8. The controller of claim 4 wherein said controller is coupled to a plurality of said correlation circuits, each correlation circuit including one of said image memories and further comprising:

a pattern memory; and correlation means for simultaneously comparing a plurality of bits from said pattern memory to a plurality of combinations of a plurality of bits from said image memory.

9. The controller of claim 4 wherein said plurality of correlation circuits are coupled to a printed circuit board and further comprising a plurality of said correlation circuit boards coupled to said controller in parallel and a separate enable line coupling each of said correlation boards to said controller.

* * * * *